(12) United States Patent
Kobayashi et al.

(10) Patent No.: US 12,015,351 B2
(45) Date of Patent: Jun. 18, 2024

(54) POWER CONVERSION APPARATUS

(71) Applicant: DENSO CORPORATION, Kariya (JP)

(72) Inventors: Naoto Kobayashi, Nisshin (JP); Syuji Kurauchi, Kariya (JP); Yuuichi Handa, Kariya (JP)

(73) Assignee: DENSO CORPORATION, Kariya (JP)

( * ) Notice: Subject to any disclaimer, the term of this patent is extended or adjusted under 35 U.S.C. 154(b) by 234 days.

(21) Appl. No.: 17/730,417

(22) Filed: Apr. 27, 2022

(65) Prior Publication Data
US 2022/0255445 A1    Aug. 11, 2022

Related U.S. Application Data

(63) Continuation of application No. PCT/JP2020/040536, filed on Oct. 28, 2020.

(30) Foreign Application Priority Data

Oct. 30, 2019    (JP) ................................. 2019-197371

(51) Int. Cl.
| H02M 3/335 | (2006.01) |
| H02M 1/32 | (2007.01) |
| H02M 3/158 | (2006.01) |
| B60R 16/033 | (2006.01) |

(52) U.S. Cl.
CPC ......... *H02M 3/33573* (2021.05); *H02M 1/32* (2013.01); *H02M 3/158* (2013.01); *H02M 3/33576* (2013.01); *B60R 16/033* (2013.01)

(58) Field of Classification Search
CPC .... H02M 3/33573; H02M 1/32; H02M 3/158; H02M 3/33576
See application file for complete search history.

(56) References Cited

U.S. PATENT DOCUMENTS

| 5,834,132 A | 11/1998 | Hasegawa et al. | |
| 2018/0086177 A1* | 3/2018 | Agathocleous | ......... B60L 58/26 |
| 2020/0274375 A1* | 8/2020 | Griffiths | .................... H02J 7/24 |

* cited by examiner

*Primary Examiner* — Jue Zhang
*Assistant Examiner* — Afework S Demisse
(74) *Attorney, Agent, or Firm* — Oliff PLC

(57) ABSTRACT

A power conversion apparatus includes an input side terminal, an output side terminal and a switch unit, switching the switch unit between ON and OFF during a power transmission. The switch unit has characteristics that, in the case where a reverse current flows through the switch unit, the larger a gate voltage thereof in a negative side, the larger a conduction loss occurring when the reverse current flows. The power conversion apparatus is provided with a control unit that increases, when determined that the increase request for increasing the heating value is present, the gate voltage of the switch unit to the negative side when turned OFF compared to a case where no increase request for increasing the heating value is present, the reverse current flowing through the switch unit during the power transmission.

9 Claims, 19 Drawing Sheets

FIG.3
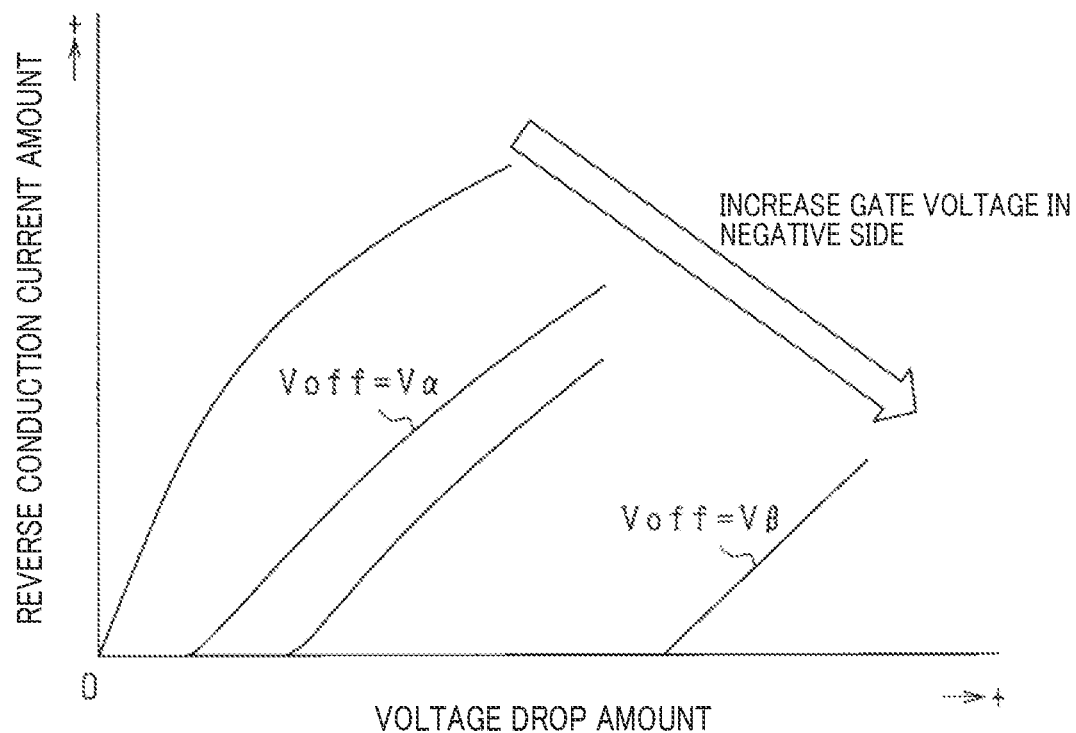
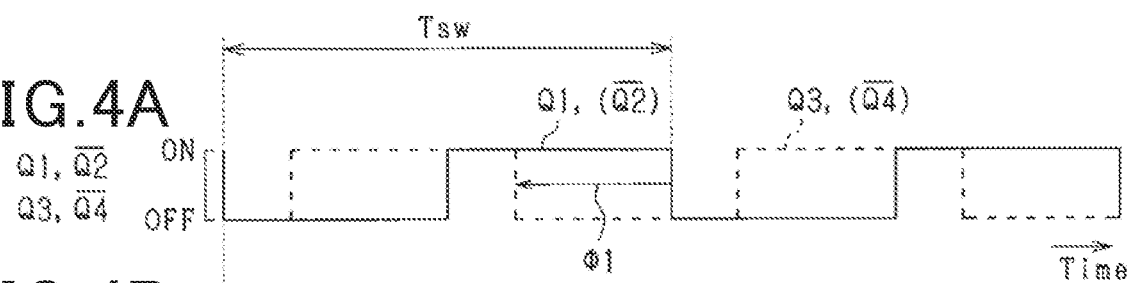
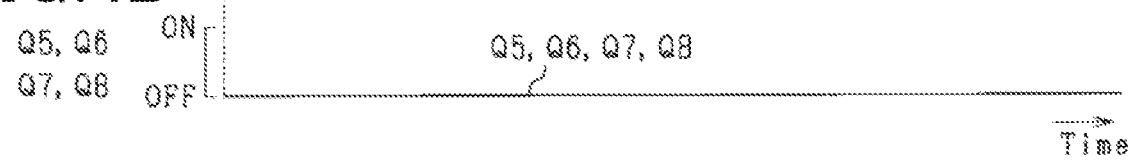

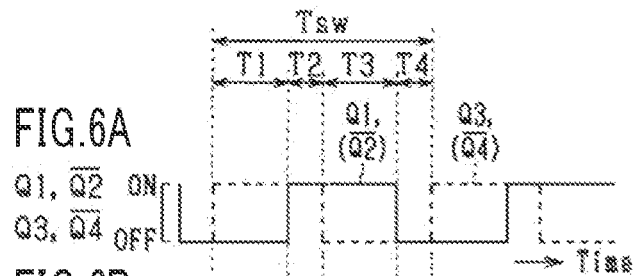
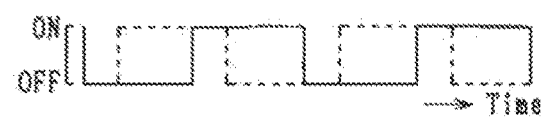
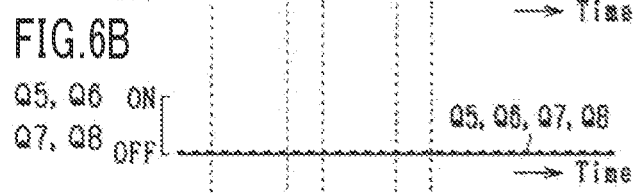
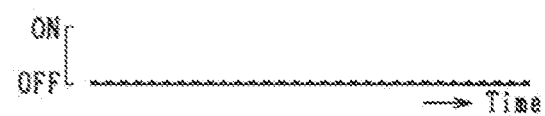
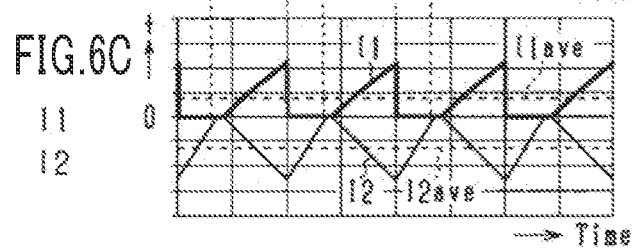
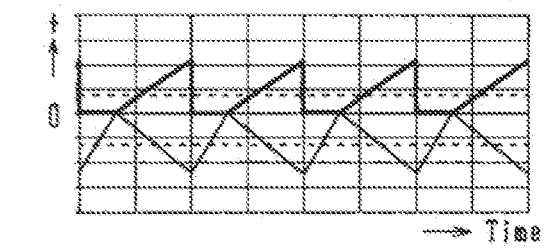
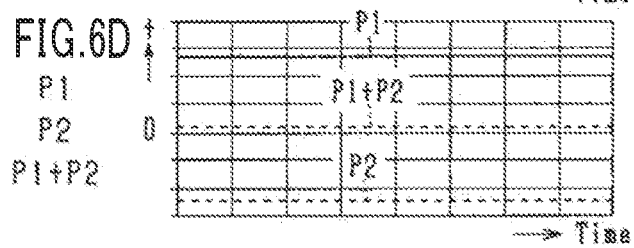
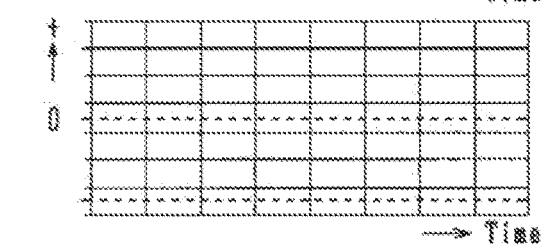
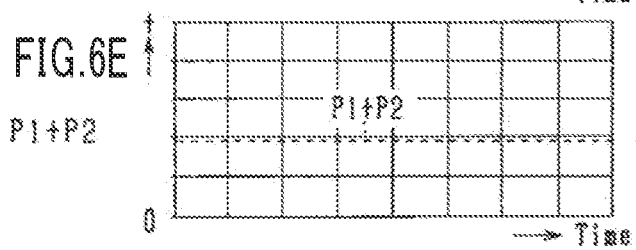
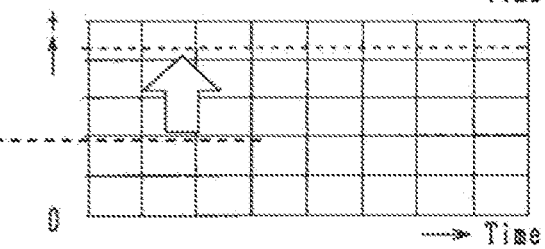

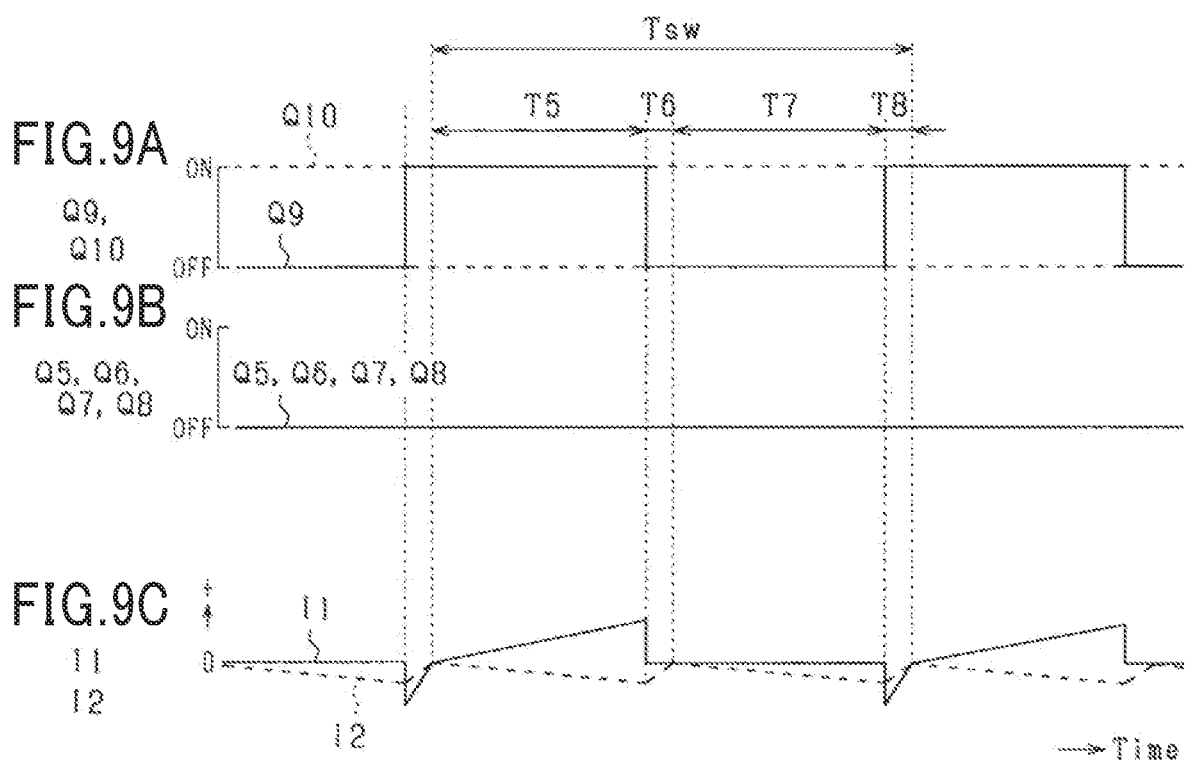

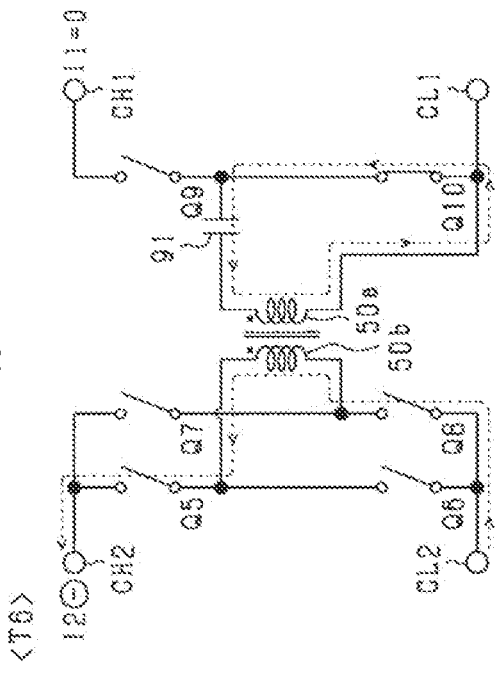
FIG.10A
FIG.10B
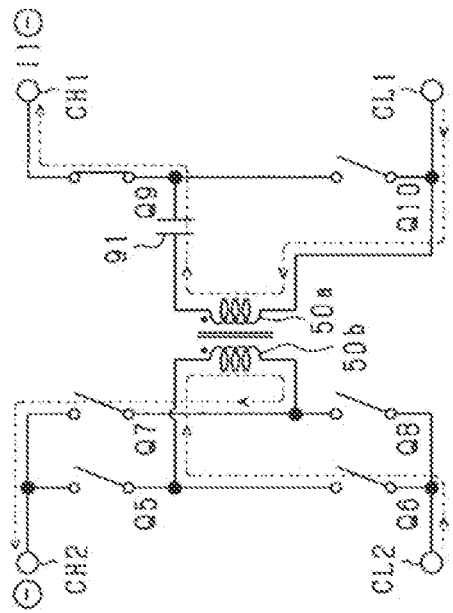
FIG.10C
FIG.10D
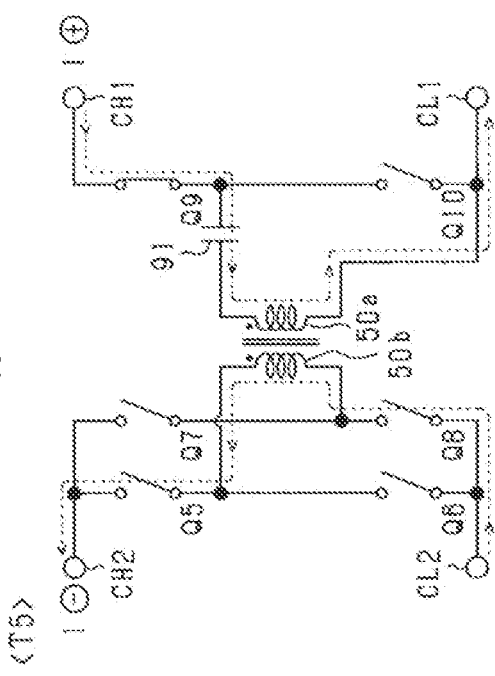
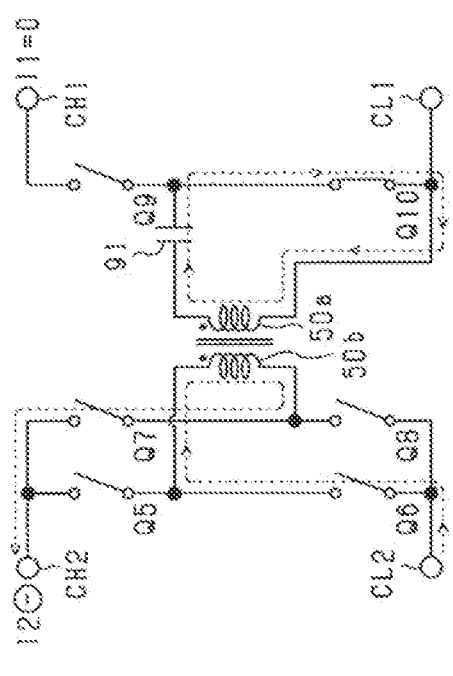

⟨NORMAL MODE (Voff=Vα)⟩    ⟨HEATING MODE (Voff=Vβ <Vα)⟩
FIG.14A
Q11, ON
Q12 OFF
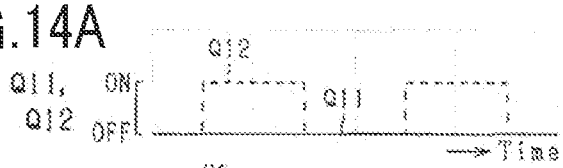 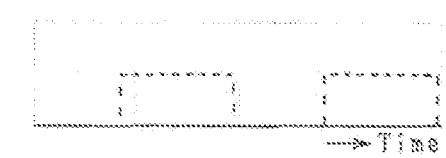
FIG.14B
V1
V2
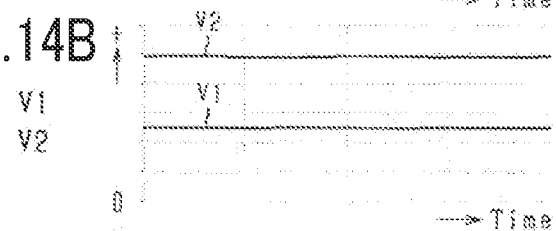 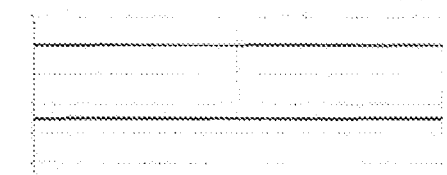
FIG.14C
I1
I2
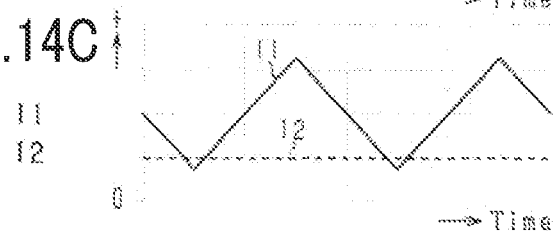 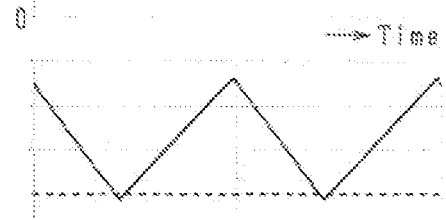
FIG.14D
P1
P2
P1-P2
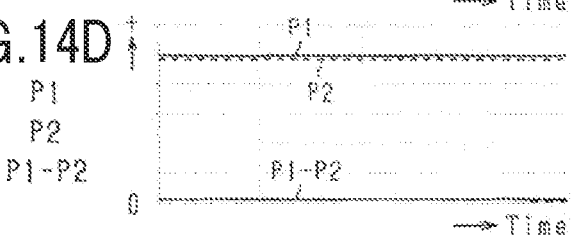 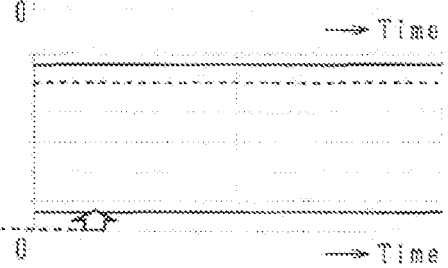

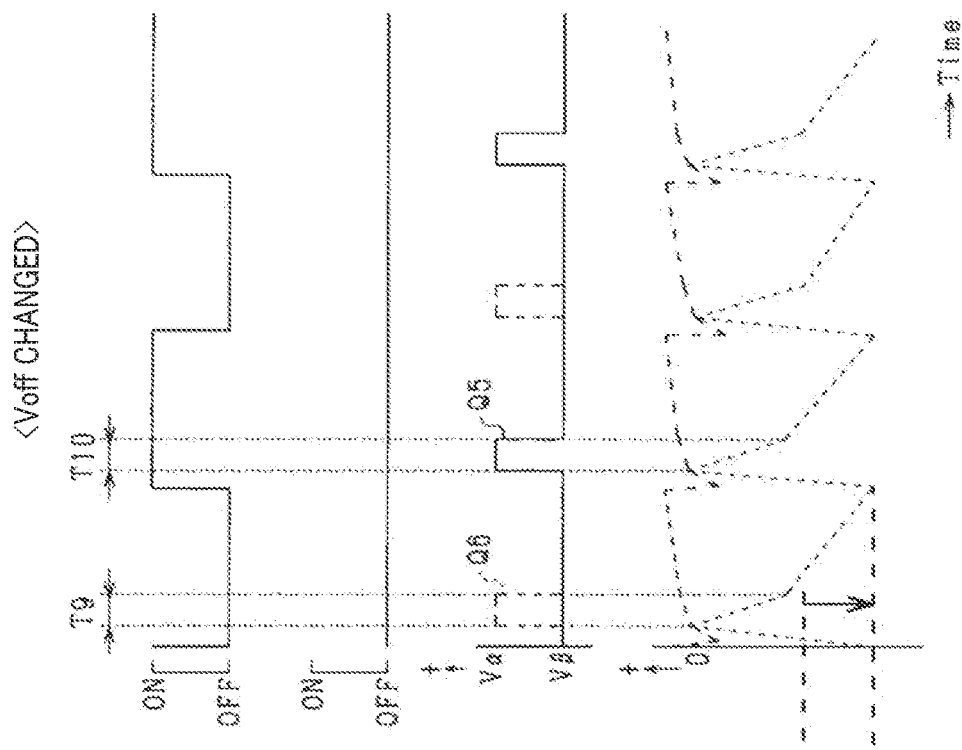

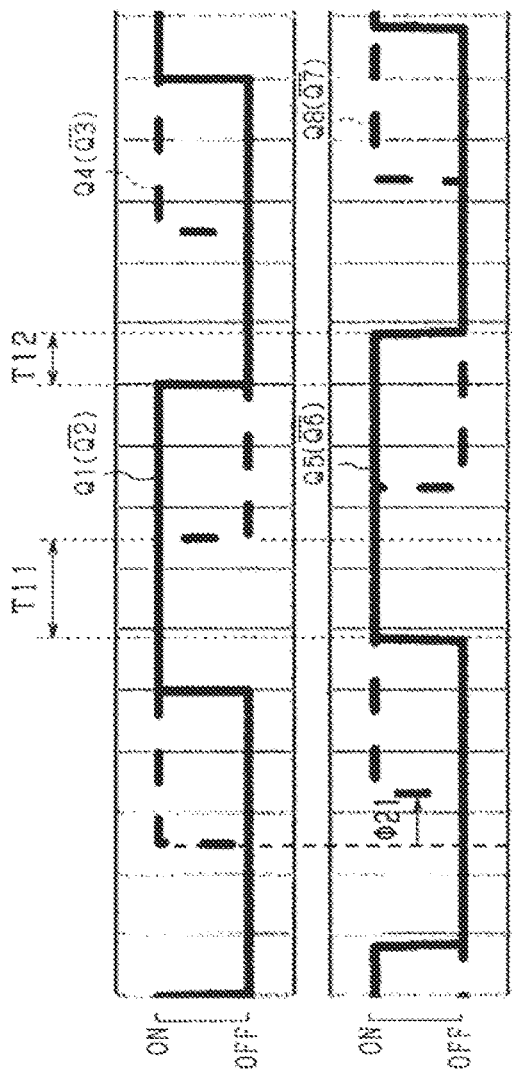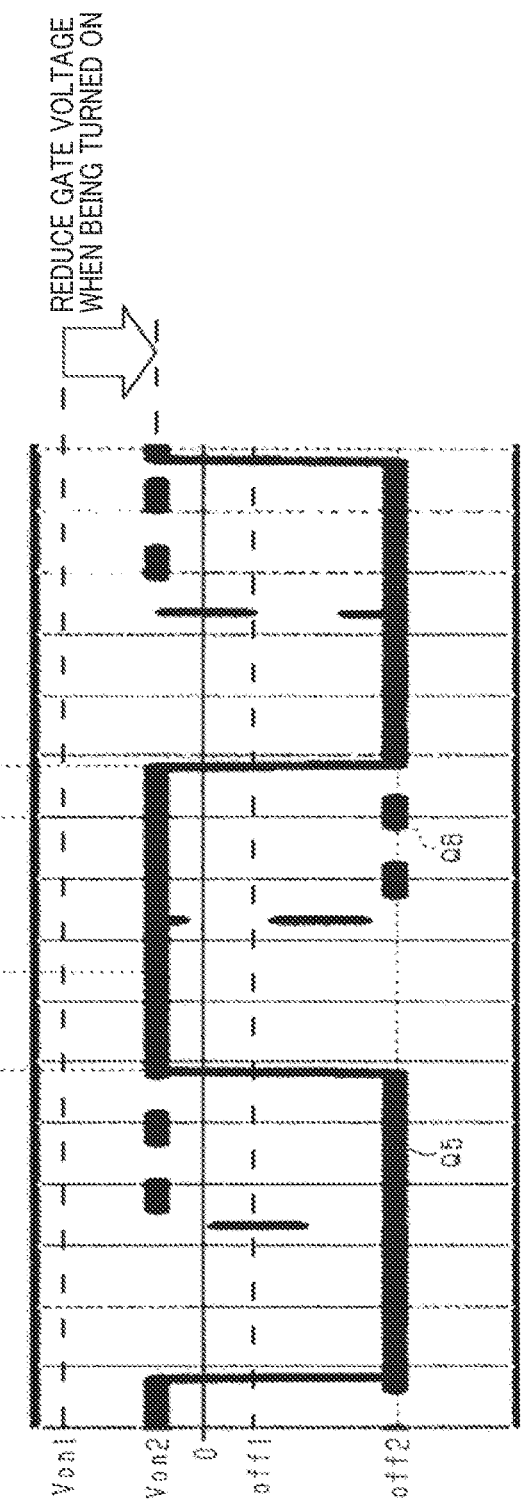

⟨T11⟩

⟨T12⟩

<NORMAL MODE>

POWER CONVERSION APPARATUS

CROSS-REFERENCE OF RELATED APPLICATION

This application is the U.S. bypass application of International Application No. PCT/JP2020/040536 filed on Oct. 28, 2020, which designated the U.S. and claims priority to Japanese Application No. 2019-197371, filed Oct. 30, 2019, the contents of these are incorporated herein by reference.

BACKGROUND

Technical Field

The present disclosure relates to a power conversion apparatus.

Description of the Related Art

Conventionally, as a control, electrical energy of a storage battery is converted to thermal energy and increases a temperature of a temperature increasing object element. For example, a patent literature discloses a power conversion apparatus in which heat exchange fluid heated by an electrical heater is used to increase the temperature of the storage battery as a temperature increasing object element.

SUMMARY

The present disclosure provides a power conversion apparatus including: a determination unit that determines whether an increase request of a heating value due to the power transmission is present; and a control unit that increases, when determined that the increase request for increasing the heating value is present, the gate voltage of the switch unit to the negative side when turned OFF compared to a case where no increase request for increasing the heating value is present, the reverse conduction current flowing through the switch unit during the power transmission.

BRIEF DESCRIPTION OF THE DRAWINGS

The above-described objects and other objects, features and advantages of the present disclosure will be clarified further by the following detailed description with reference to the accompanying drawings. The drawings are:

FIG. 3 is a graph showing characteristics of a reverse conduction current flowing through a GaN-HEMT;

FIGS. 4A and 4B are timing diagrams each showing a change in an operational state of each switch in a normal mode and a heating mode;

FIGS. 6A, 6B, 6C, 6D and 6E are timing diagrams each showing a current waveform and the like in the normal mode and the heating mode;

FIGS. 9A, 9B, 9C are timing diagrams each showing a change in an operational state in the normal mode and the heating mode;

FIGS. 10A, 10B, 10C and are diagrams each showing a current path in the normal mode and the heating mode;

FIGS. 14A, 14B, 14C and 14D are timing diagrams each showing current waveforms and the like in the normal mode and the heating mode;

FIGS. 17A, 17B, 17C and 17D are timing diagrams each showing a current waveform and the like in the heating mode according to a fourth embodiment;

FIGS. 18A, 18B and 18C are timing diagrams each showing a change in an operational state of each switch in a heating mode according to a fifth embodiment;

FIG. 20 is a graph showing characteristics of a conduction current quantity and a voltage drop quantity in the case where the gate voltage is lowered when turning ON;

DETAILED DESCRIPTION OF THE PREFERRED EMBODIMENTS

Conventionally, as a control, electrical energy of a storage battery is converted to thermal energy and increases a temperature of a temperature increasing object element. For example, Japanese Patent No. 3451141 discloses a power conversion apparatus in which heat exchange fluid heated by an electrical heater is used to increase the temperature of the storage battery as a temperature increasing object element.

When an electrical heater is additionally provided in order to increase the temperature of the storage battery, there is a concern that the size of the power conversion apparatus may be increased.

First Embodiment

Hereinafter, with reference to the drawings, a first embodiment in which a power conversion apparatus according to a present embodiment is embodied will be described. The power conversion apparatus according to the present embodiment is mounted on an electrification vehicle such as a plug-in hybrid vehicle or an electric vehicle or the like.

Figure 1:
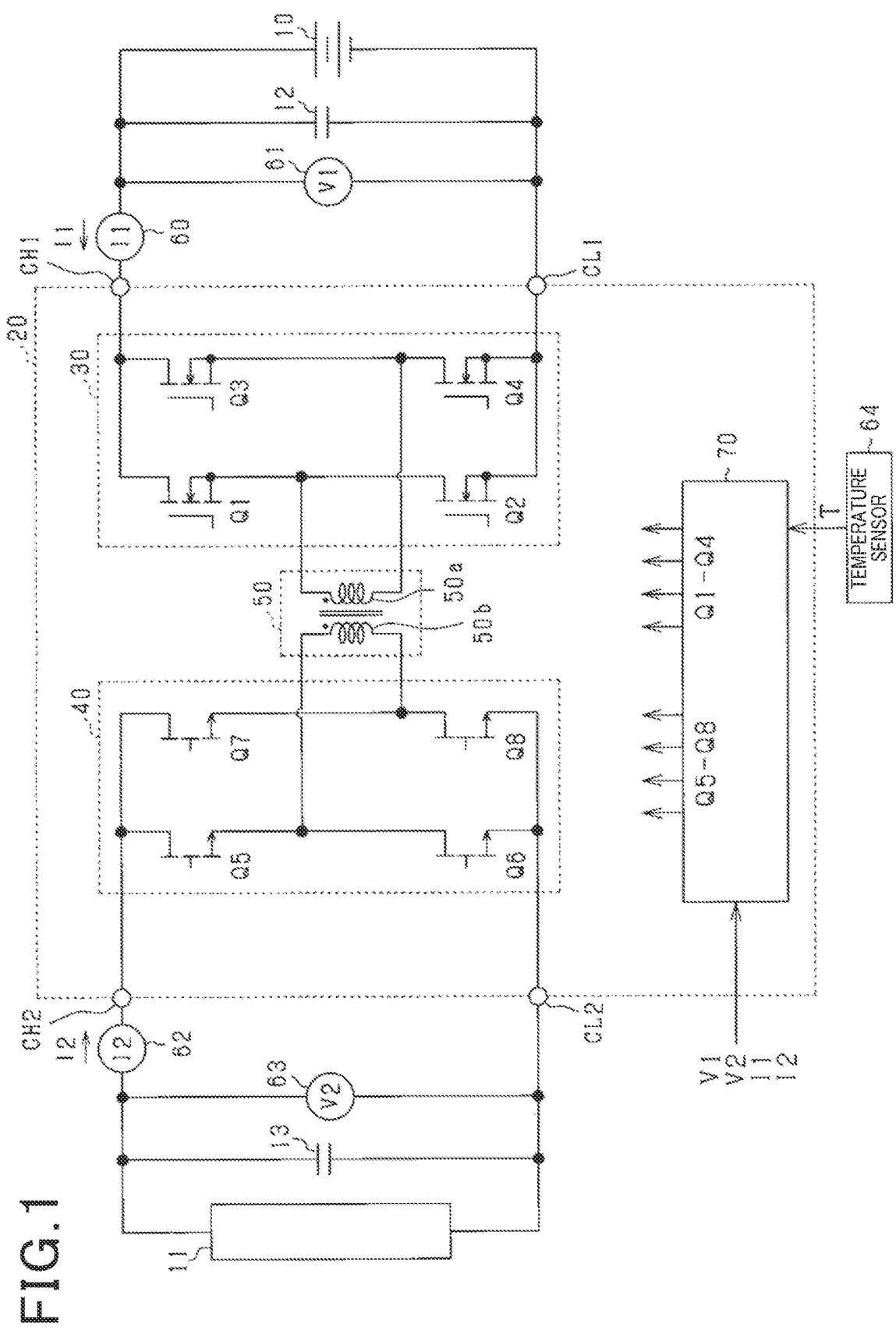
FIG. 1 is a diagram showing a configuration of a power conversion apparatus according to a first embodiment.

As shown in FIG. 1, the power conversion system is provided with a storage battery 10 as a storage unit, a power supply object 11, a first capacitor 12, a second capacitor 13 and a power conversion apparatus 20.

The storage battery 10 supplies power to the power supply object via the power conversion apparatus 20. The storage battery 10 is a secondary battery capable of being charged or discharged, for example, a lithium-ion battery. The power supply object 11 includes at least one of a low voltage storage battery having lower output voltage than that of the storage battery 10 and an electrical load. The low voltage storage battery is, for example, a lead acid battery. The electrical load is, for example, a head lamp.

The power conversion apparatus 20 is provided with a first high voltage side terminal CH1, a first low voltage side terminal CL1, a full-bridge circuit 30, a second high voltage side terminal CH2, a low voltage side terminal CL2, a second full-bridge circuit 40 and a transformer. According to the present embodiment, the first high voltage side terminal CH1 and the low voltage side terminal CL1 correspond to a pair of input side terminals, the second high voltage side terminal CH2 and the second low voltage side terminal CL2 corresponds to output side terminal. Also, the first full-bridge circuit 30 corresponds to a conversion circuit.

The first full-bridge circuit 30 is provided with first to fourth switches Q1 to Q4. In the present embodiment, the first to fourth switch Q1 to Q4 are configured as N-channel MOSFET. Further, the second full-bridge circuit 40 is provided with fifth to eighth switches Q5 to Q8. According to the present embodiment, the fifth to eighth switches Q5 to Q8 are configured as GaN-HEMT. Note that, GaN refers to gallium nitride, and HEMT refers to high electron mobility transistor. The GaN-HEMT serves as a switching device having characteristics in which the voltage drop in the reverser conduction increases when applying negative voltage to the gate. According to the present embodiment, fifth to eighth switches Q5 to Q8 correspond to switch unit. Note that, the drain corresponds to a high voltage side terminal and the source corresponds to low voltage side terminal.

In the first full-bridge circuit 30, the first high voltage side terminal CH1 is connected to the drains of the first switch Q1 and the third switch Q3. The drain of the second switch Q2 is connected to the first switch Q1, and the drain of the fourth switch Q4 is connected to the source of the third switch Q3. The first low voltage side terminal CL1 is connected to the source of the second switch Q2 and the fourth switch Q4. The first low voltage side terminal CL1 is connected to the first high voltage side terminal CH1 via the first capacitor 12. Further, the positive terminal of the storage battery 10 is connected to the first high voltage side terminal CH1, and the first low voltage side terminal CL1 is connected to the negative terminal of the storage battery 10.

In the second full-bridge circuit 40, the second high voltage side terminal CH2 is connected to the drains of the fifth switch Q5 and the seventh switch Q7. The drain of the sixth switch Q6 is connected to the source of the fifth switch Q5. The drain of the eighth switch Q8 is connected to the source of the seventh switch Q7. The second low voltage side terminal CL2 is connected to the source of the sixth switch Q6 and the source of the eighth switch Q8. The second low voltage side terminal CL2 is connected to the second high voltage side terminal CH2 via the second capacitor 13. Further, the second low voltage side terminal CL2 is connected to the second high voltage side terminal CH2 via the power supply object 11.

The transformer 50 includes a first coil 50a and a second coil 50b. The source of the first switch Q1 and the drain of the second switch Q2 are connected to a first end of the first coil 50a, and the source of the third switch Q3 and the drain of the fourth switch Q4 are connected to a second end of the first coil 50a. The source of the fifth switch Q5 and the drain of the sixth switch Q6 are connected to a first end of the second coil 50b, and the source of the seventh switch Q7 and the drain of the eighth switch Q8 are connected to a second end of the second coil 50b.

The first coil 50a and the second coil 50b are magnetically coupled with each other. When the voltage at the first end is higher than that of the second end of the first coil 50a, an induced voltage is generated at the second coil 50b such that the voltage at the first end is higher than that of the second end. On the other hand, when the voltage at the second end is higher than that of the first end of the first coil 50a, an induced voltage is generated at the second coil 50b such that the voltage at the second end is higher than that of the first end.

The power conversion system is provided with a first current sensor 60, a first voltage sensor 61, a second current sensor 62, a second voltage sensor 63 and a temperature sensor 64. The first current sensor 60 detects a first current I1 flowing through the first high voltage side terminal CH1, and the first voltage sensor 61 detects a first voltage V1 as a terminal voltage between the first high voltage side terminal CH1 and the first low voltage side terminal CL1. For the first current I1, a direction along which the discharge current flows from the storage battery 10 is defined as positive, and a direction along which the charge current flows into the storage battery 10 is defined as negative direction.

The second current sensor 62 detects a second current I2 flowing through the second high voltage side terminal CH2, and the second voltage sensor 63 detects a second voltage V2 as a terminal voltage between the second high voltage side terminal CH2 and the second low voltage side terminal CL2. For the second current I2, a direction along which the current flows from the second high voltage side terminal CH2 to the drains of the fifth switch Q5 and the seventh switch Q7 is defined as a positive direction, and a direction along which the current flows in the inverse direction thereof is defined as a negative direction.

The temperature sensor 64 detects an environmental temperature T. According to the present embodiment, the environmental temperature T refers to a temperature of a temperature increasing object. The temperature increasing object according to the present embodiment refers to, for example, the power conversion apparatus 20.

Respective detection values I1, V1, I2, V2 and T are transmitted to the control unit 70 included in the power conversion apparatus 20. The control unit 70 outputs drive signals to switches Q1 to Q8 based on the respective detection values I1, V1, I2, V2 and T, thereby switching the respective switches Q1 to Q8 to be ON and OFF.

Next, a temperature rise control performed in the present embodiment will be described. According to the present embodiment, when the environmental temperature T is higher than the setting a set temperature, it is determined that there is no increase request of a heating value and a normal mode is set in the control. On the other hand, when the environmental temperature T is lower than or equal to the set temperature, it is determined that there is an increase request of a heating value and a heating mode is set in the control.

Figure 2:
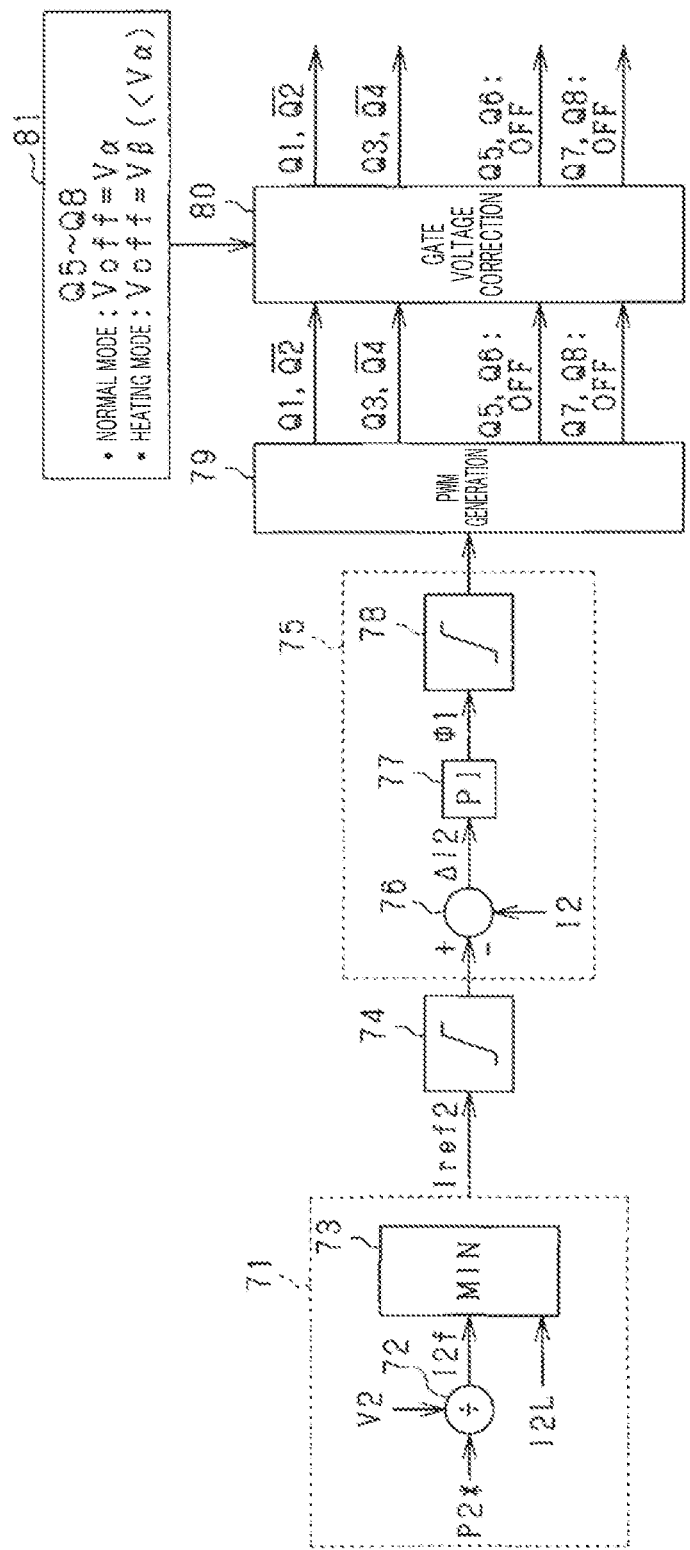
FIG. 2 is a functional block diagram showing a control unit n a normal mode and a heating mode.

FIG. 2 is a diagram showing a control block diagram performed by the control unit 70 in the normal mode and the heating mode.

The control unit 70 is provided with a command current setting unit 71. The command current setting unit 71 is provided with a current calculation unit 72 and a minimum value selection unit 73.

The current calculation unit 72 divides a power command value P2* by a second voltage V2 which is a detection voltage of the second voltage sensor 63, thereby calculating a command current I2f. Note that, sign of current direction of the command current I2f is defined similar to the sign of the second current I2.

The minimum value selection unit 73 selects one having smaller value from among the command current I2f calculated by the current calculation unit 72 and a current limited value I2L and determines the selected one to be the final command current Iref2. The current limit value I2L is set in order to protect the power conversion system from suffering overcurrent.

A first limiter 74 limits the command current Iref2 outputted by the minimum value selection unit 73 with the upper limit value or the lower limit value The control unit 70 is provided with a current control unit 75. The current control unit 75 includes a current deviation calculation unit 76, a feedback control unit 77 and a second limiter 78. The current deviation calculation unit 76 subtracts the second current I2 which is the detection current of the second current sensor 62 from the command current Iref2 outputted by the first limiter 74, thereby calculating the current deviation ΔI2.

The feedback control unit 77 calculates an inter-leg phase φ1 as an operation quantity for feedbacking the calculated current deviation ΔI2 to be 0. According to the present, for this feedback control, a proportional integration control is used. Note that, the feedback control used for the feedback control unit 77 is not limited to the proportional integration control, but a proportional integration differential control may be used.

The inter-leg phase φ1 calculated by the feedback control unit 7 is limited by the second limiter 78 with the upper limit value or the lower limit value. According to the present embodiment, inter-leg phase φ1 is limited to be in a range from 0° to a predetermined phase. Within this range, the larger the phase value, the larger the transmission power between the storage battery 10 and the power supply object 11 is.

The control unit 70 is provided with a PWM generation unit 79, a gate voltage correction unit 80, a gate voltage setting unit 81.

The PWM generation unit 79 generates drive signals for respective switches Q1 to Q8 based on the inter-leg phase φ1 received from the second limiter and outputs the generated drive signals to the gate voltage correction unit 80. According to the present embodiment, the PWM generation unit 79 turns the first to fourth switches Q1 to Q4 to be ON and OFF, and generates drive signals for turning the fifth to eighth switches Q5 to Q8 to be OFF.

The gate voltage correction unit 80 corrects the gate voltages Voff of the fifth to eighth switches Q5 to Q8 when turned OFF based on the command transmitted from the gate voltage setting unit 81. Thereafter, the gate voltage correction unit 80 outputs the drive signals in which the above correction is applied to the gates of respective switches Q1 to Q8.

The gate voltage setting unit 81 sets the gate voltages Voff of the fifth to eighth switches Q5 to Q8 when turned (WE to be a first off voltage Vα (e.g. 0V) during the normal mode, and sets them to be a second off voltage Vβ during the heating mode. Here, the second off voltage Vβ is smaller than the first off voltage Vα and is a negative voltage according to the present embodiment. Setting the gate voltage Voff during the OFF state to be the second off voltage Vβ means that the gate voltage Voff during the OFF state increases to the negative side.

FIG. 3 is a graph showing characteristics of reverse conduction current flowing through GaN-HEMT. The vertical axis indicates Tan amount of reverser conduction current and the horizontal axis indicates an amount of voltage drop. An arrow in FIG. 3 indicates a direction along which the gate voltage Voff increases to the negative side. Hence, when Voff is Vβ (Voff=Vβ) where the gate voltage Voff during the OFF state increases to the negative side, since the amount of voltage drop during a reverse conduction increases compared to the case of Voff=Vα, the conduction loss also becomes larger.

FIGS. 4A and 4B are diagrams each showing a change in the operational state of respective switches Q1 to Q8 in the normal mode and the heating mode. FIG. 4A shows a change in the operational state of the first to fourth switch Q1 to Q4 and FIG. 4B shows a change in the operational state of the fifth to eighth switches Q5 to Q8.

The solid line of FIG. 4A shows a change in the operational state of the first switch Q1. An inverted operational state of the first switch Q1 corresponds the operational state of the second switch Q2. The dotted line of FIG. 4A shows an operational state of the third switch Q3. An inverted operational state of the third switch Q3 corresponds to the operational sate of the fourth switch Q4. For example, in FIG. 4A, the ON period of the first switch Q1 equals to the OFF period of the second switch Q2.

The solid line in FIG. 4B indicates an operational state of the fifth to eighth switches Q5 to Q8. According to the present embodiment, the fifth to eighth switches Q5 to Q8 are OFF state.

One switching period Tsw between the first to fourth switches Q1 to Q4 is mutually the same. A phase difference between a switching timing when the first switch Q1 is turned OFF and a switching timing when the third switch Q3 is turned OFF is defined as an inter-leg phase φ1. According to the present embodiment, the inter-leg phase φ1 is positive when the switching timing of the third switch Q3 to be OFF becomes earlier than he switching timing when the first switch Q1 is turned. OFF. For example, in FIG. 4A, the inter-leg phase φ1 is positive.

Figure 5:
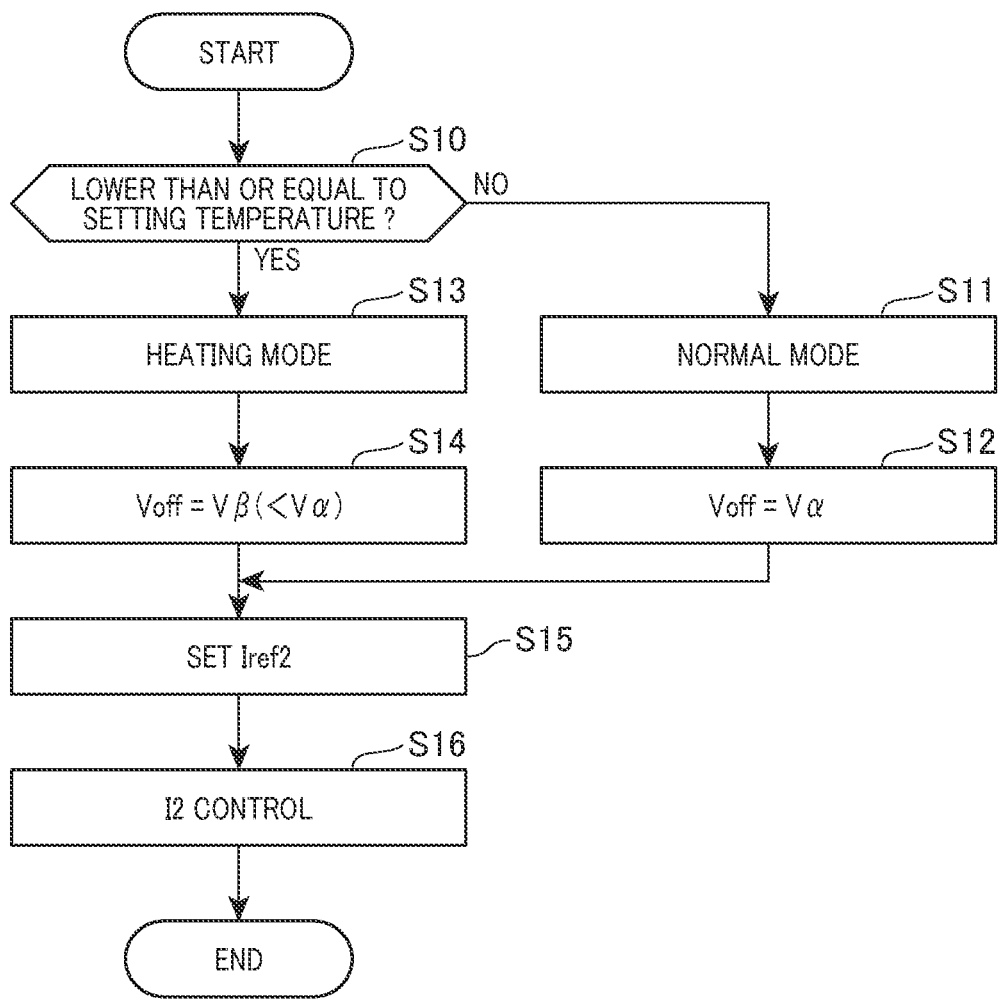
FIG. 5 is a flowchart showing a process of a control unit.

FIG. 5 shows a process executed by the control unit 70. This process is repeatedly executed at a predetermines control period, for example. Note that, according to the present embodiment, the product between the first voltage V and the number of windings of the first coil 50a is set to be larger than the product between the second voltage V2 and the number of windings of the second coil 50b. That is, with this process, the power is transmitted to the power supply object 11 from the storage battery 10.

At step S10, the process determines whether the environmental temperature T is lower than or equal to the set temperature. In the present embodiment, step S10 corresponds to determination unit.

When the determination at step S10 is negative, the process determines that no increase request is present for increasing a heating value, proceeds to step S11 and sets the control mode to be the normal mode. In the normal mode, the process sets, at step S12, the gate voltages Voff of the fifth to eighth switches Q5 to Q8 during the OFF state to be the first off voltage Vα.

When the determination at step S10 is affirmative, the process determines that an increase request is present for increasing a heating value, and sets the control mode to be the heating mode. In the heating mode, the process sets, at next step S14, the gate voltages Voff of the fifth to eighth switches during the OFF state to be the second off voltage Vβ.

At step S15, the process sets a command current Iref2 at the command current setting unit 71.

At step S16, the process switches the first to fourth switches Q1 to Q4 to be ON and OFF and switches the fifth to eighth switches Q5 to Q8 to be OFF such that the second current I2 is controlled to be the command current Iref2.

FIGS. 6A, 6B, 6C, 6D and 6E show a change in the operational states or the like of the switches Q1 to Q8 in the normal mode and the heating mode. FIG. 6A show a change in the operational states of the first to fourth switches Q1 to Q4. FIG. 6B shows a change in the operational states of the fifth to eighth switches Q5 to Q8.

FIG. 6C shows a change in the first current I1 and the second current I2. FIG. 6D shows a first power P1, a second power P2 and a loss power P1+P2. The first power P1 refers to a time mean value of the power supplied to the first full-bridge circuit 30 from the storage battery 10, and the second power P2 refers to a time mean value of the power supplied to the power supply object 11 from the second full-bridge circuit 40. When the first power P1 is positive, power is discharged from the storage battery 10. When the second power P2 is negative, the power is supplied to the power supply object 11. Hence, the sum of the first power P1 and the second power P2, that is, P1+P2 is referred to as a loss power. In the case where the loss power P1+P2 is in the positive side, the electrical energy is converted to a heat energy, thereby producing heat. FIG. 6E is a diagram in which the vertical axis of the loss power P1+P2 shown in FIG. 6D is enlarged. In FIG. 6E, the scale of the vertical axis for the normal mode and the heating mode is the same. FIG. 6 is used for comparing magnitude of the loss power P1+P2 between the normal mode and the heating mode.

Hereinafter, with reference to FIGS. 6A to 6E and FIGS. 7A to 7D, a temperature rise control in a normal mode and a heating mode according to the present embodiment will be described. In the heating mode according to the present embodiment, the value of the inter-leg phase φ1 ranges from 0° to a predetermined phase value. The inter-leg phase φ1 is restricted to be in a range from 0° to a predetermined phase value, whereby the power capable of being transmitted from the storage battery 10 to the power supply object 11 can be prevented from being decreased because the inter-leg phase φ1 is set to be much higher.

As shown in FIG. 6A, in the normal mode and the heating mode according to the present embodiment, first to fourth periods T1 to T4 are present during one switching period Tsw. According to the present embodiment, switching modes are the same between the normal mode and the heating mode. In the first period T1, the second and third switches Q2 and Q3 are turned ON, and the first, fourth, fifth, sixth, seventh and eighth switches Q1, Q4, Q5, Q6, Q7 and Q8 are turned OFF. In the second period T2, the first and third switches Q1 and Q3 are turned ON and the second, fourth, fifth, sixth and eighth switches Q2, Q4, Q5, Q6, Q7 and Q8 are turned OFF.

In the third period T3, the first and fourth switches Q1 and Q4 are turned ON and the second, third, fifth, sixth, seventh and eighth switches Q2, Q3, Q5, Q6, Q7 and Q8 are turned OFF. In the fourth period T4, the second and fourth switches Q2 and Q4 are turned ON and the first, third, fifth, sixth, seventh and eighth switches Q1, Q3, Q5, Q6, Q7 and Q8 are turned OFF.

Figure 7A:
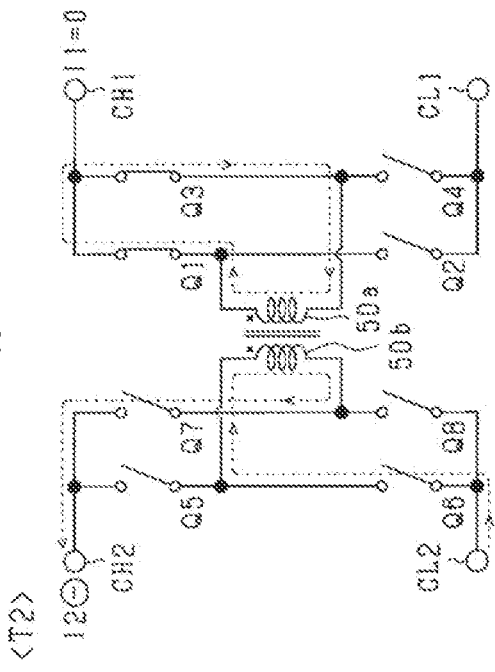
FIGS. 7A, 7B, 7C, 7D are diagrams each showing current paths in the normal mode and the heating mode.

FIG. 7A shows a current path in the first period T1. In the first full-bridge circuit 30, a current path is formed including the third switch Q3, the first coil 50a, the second switch Q2 and the first low voltage side terminal CL1. On the other hand, in the second fill-bridge circuit 40, a current path is formed including the second low voltage side terminal CL2, the sixth switch Q6, the second coil 50b, the seventh switch Q7 and the second high voltage side terminal CH2. In this case, the sixth switch Q6 and the seventh switch Q7 are turned OFF, however, because of the characteristics of GaN-HEMT, a reverse conduction current flows through the sixth switch Q6 and the seventh switch Q7.

Thus, as shown in FIG. 6C, in the first period T1, the first current I1 slight increases in the positive direction and the second current I2 slightly decreases in the negative direction. In the first period T1, since the gate voltage Voff when turned OFF increases to the negative side in the heating mode compared to that in the normal mode, the conduction loss due to the reverse conduction current of the sixth switch Q6 and the seventh switch Q7 is larger than that in the normal mode, because of the GaN-HEMT characteristics.

Figure 7B:
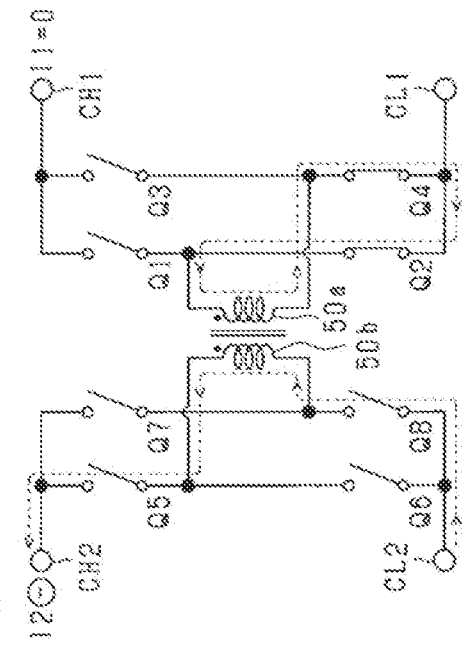

FIG. 7B shows a current path in the second period T2. In the first full-bridge circuit 30, a current path is formed including the first switch Q1, the third switch Q3 and the first coil 50a. On the other hand, in the second full-bridge circuit 40, the current path the same as that of the first period T1 is formed.

In the second period T2, since the first coil 50a is not connected to the first low voltage side terminal CL1, as shown in FIG. 6C, the first current I1 is 0. For the first full-bridge circuit 30, an induced voltage is temporarily produced at the first coil 50a such that the voltage at the first end is higher than that of the second end. Thus, at the second coil 50b, an induced voltage is temporarily produced such that the voltage at the second end is higher than that of the first end. Therefore, the absolute value of the second current I2 slightly decreases when the sign of the second current I2 is negative. Even in this case, because of the characteristics of GaN-HEMT, the conduction loss due to the reverse conduction current in the heating mode is larger than that of the normal mode.

Figure 7C:
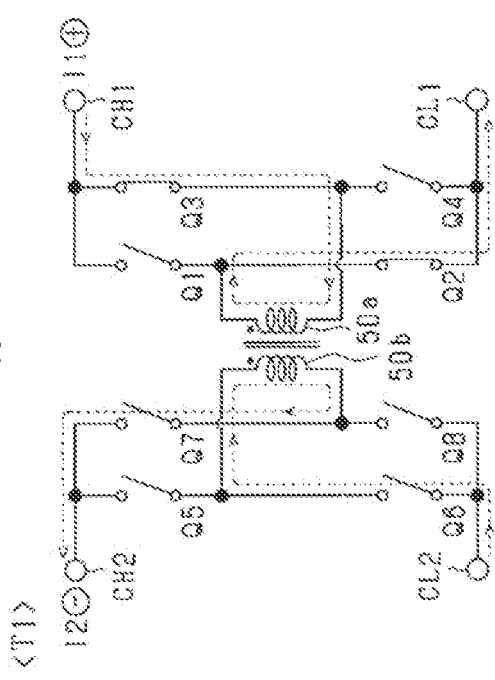

FIG. 7C shows a current path in the third period T3. In the first full-bridge circuit 30, a current path is formed including the first high voltage side terminal CH1, the first switch Q1, the first coil 50a, the fourth switch Q4 and the first low voltage side terminal CL1. On the other hand, in the second full-bridge circuit 40, a current path is formed including the second low voltage side terminal CL2, the eighth switch Q8, the second coil 50b, the fifth switch Q5 and the second high voltage side terminal CH2. In this case, although the fifth switch Q5 and the eighth switch Q8 are turned OFF, because of the characteristics of GaN-HEMT, a reverse conduction current flows through the fifth switch Q5 and the eighth switch Q8.

Thus, as shown in FIG. 6C, in the third period T3, the first current I1 slightly increases in the positive side, and the second current I2 slightly increases in the negative direction. In the third period T3, since the gate voltage Voff when turned OFF increases to the negative side in the heating mode compared to that in the normal mode, the conduction loss due to the reverse conduction current of the fifth switch Q5 and the eighth switch Q8 is larger than that in the normal mode, because of the GaN-HEMT characteristics.

Figure 7D:
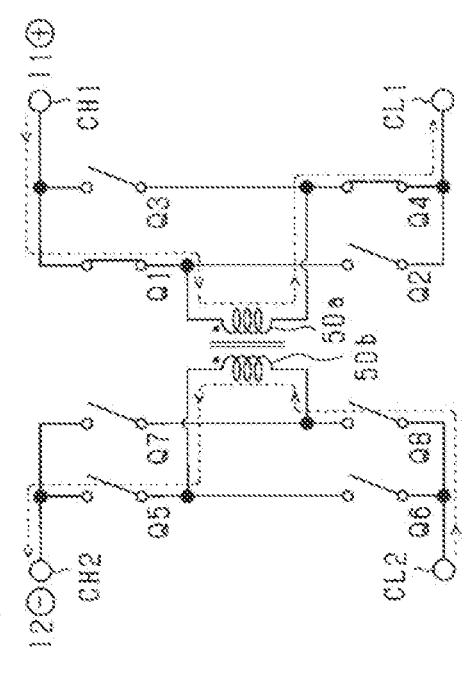

FIG. 7D shows a current path in the fourth period T4. In the first full-bridge circuit 30, a current path is formed including the second switch Q2, the first coil 50a and the fourth switch Q4. On the other hand, in the second fill-bridge circuit 40, the current path the same as that of the third period T3 is formed.

In the fourth period T4, since the first coil 50a is not connected to the first high voltage side terminal CH1, as shown in FIG. 6C, the first current I1 is 0. For the first full-bridge circuit 30, an induced voltage is temporarily produced at the first coil 50a such that the voltage at the second end is higher than that of the first end. Thus, at the second coil 50b, an induced voltage is temporarily produced such that the voltage at the first end is higher than that of the second end. Therefore, the absolute value of the second current I2 slightly decreases when the sign of the second current I2 is negative. Even in this case, because of the characteristics of GaN-HEMT, the conduction loss due to the reverse conduction current in the heating mode is larger than that of the normal mode.

In FIG. 6C, in the first to fourth periods T1 to T4, a time mean value I1ave of the first current I1 and a time mean value I2ave of the second current I2 are indicated by dotted lines. The first current average value I1ave indicates positive value and the second current average value I2ave indicates negative value.

As shown in FIG. 6D, the first power P1 indicates positive value, and the second power P2 indicates negative value. This means that the power is transferred to the power supply object 11 from the storage battery 10 in the first period T1 to the fourth period T4. With this power transfer, since power loss occurs in the respective switches Q1 to Q8, the loss power P1+P2 shows positive value.

As shown in FIG. 6E, it is found that the loss power P1+P2 in the heating mode is larger than that the loss power P1+P2 in the normal mode. This is because, since the gate voltage Voff when turned OFF increases to the negative side in the heating mode comparted to that in the normal mode, the conduction loss due to the reverse conduction current in the fifth to eighth switches Q5 to Q8 becomes larger, because of the characteristics of GaN-HEMT.

According to the present embodiment, the following effects and advantages can be obtained.

According to the present embodiment, the fifth switch to the eighth switch Q5 to Q8 are turned OFF when power is transferred to the power supply object 11 from the storage battery 10. At this moment, the reverse conduction current flows through the fifth to eighth switches Q5 to Q8 to produce conduction loss, thereby producing heat due to the conduction loss. The heat is utilized, whereby a heating apparatus for increasing the temperature of the temperature increasing object can be made unnecessary, or the heating apparatus can be made smaller even when the heating apparatus is necessary. As a result, the size of the power conversion apparatus 20 can be reduced.

Further, since the fifth to eighth switches Q5 to Q8 according to the present embodiment is configured as GaN-HEMT, in the case where the reverse conduction current flows, the switches fifth to eighth switches Q5 to Q8 have characteristics such that the larger the gate voltage Voff in the negative when turned OFF, the larger the conduction loss occurred due to the reverse conduction current is. Focusing on these characteristics, according to the present embodiment, when the heating mode is set, the gate voltages Voff of the fifth to eighth switches Q5 to Q8 when turned OFF increase to the negative side compared to a case where the normal mode is set. Thus, the conduction loss occurring on the fifth to eighth switches Q5 to Q8 when the heating mode is set can be larger than that of when the normal mode is set. As a result, the heating value generated in the power conversion apparatus 20 can be larger.

Modification Example 1 of First Embodiment

Hereinafter, for the modification example 1 of the first embodiment, configurations different from those in the first embodiment will be mainly described For the first to fourth switches Q1 to Q4, it is not limited to N-channel MOSFET, but may be configured as IGBT. In this case, the high voltage side terminal serves as a collector and the low voltage side terminal serves as an emitter. Further, when using IGBT, the first full-bridge circuit 30 includes free-wheel diodes connected in reverse with respect to respective first to fourth switches Q1 to Q4. In this case, a pair of switch and a free-wheel diode corresponds to a switch unit, Modification Example 2 of First Embodiment Hereinafter, for the modification example 2 of the first embodiment, with reference to the drawings, configurations different from those in the first embodiment will be mainly described. In the first embodiment, the first full-bridge circuit 30 is used as a conversion circuit, but this configuration will be changed in the present embodiment. According to the present embodiment, a half-bridge circuit is used as a conversion circuit.

Figure 8:
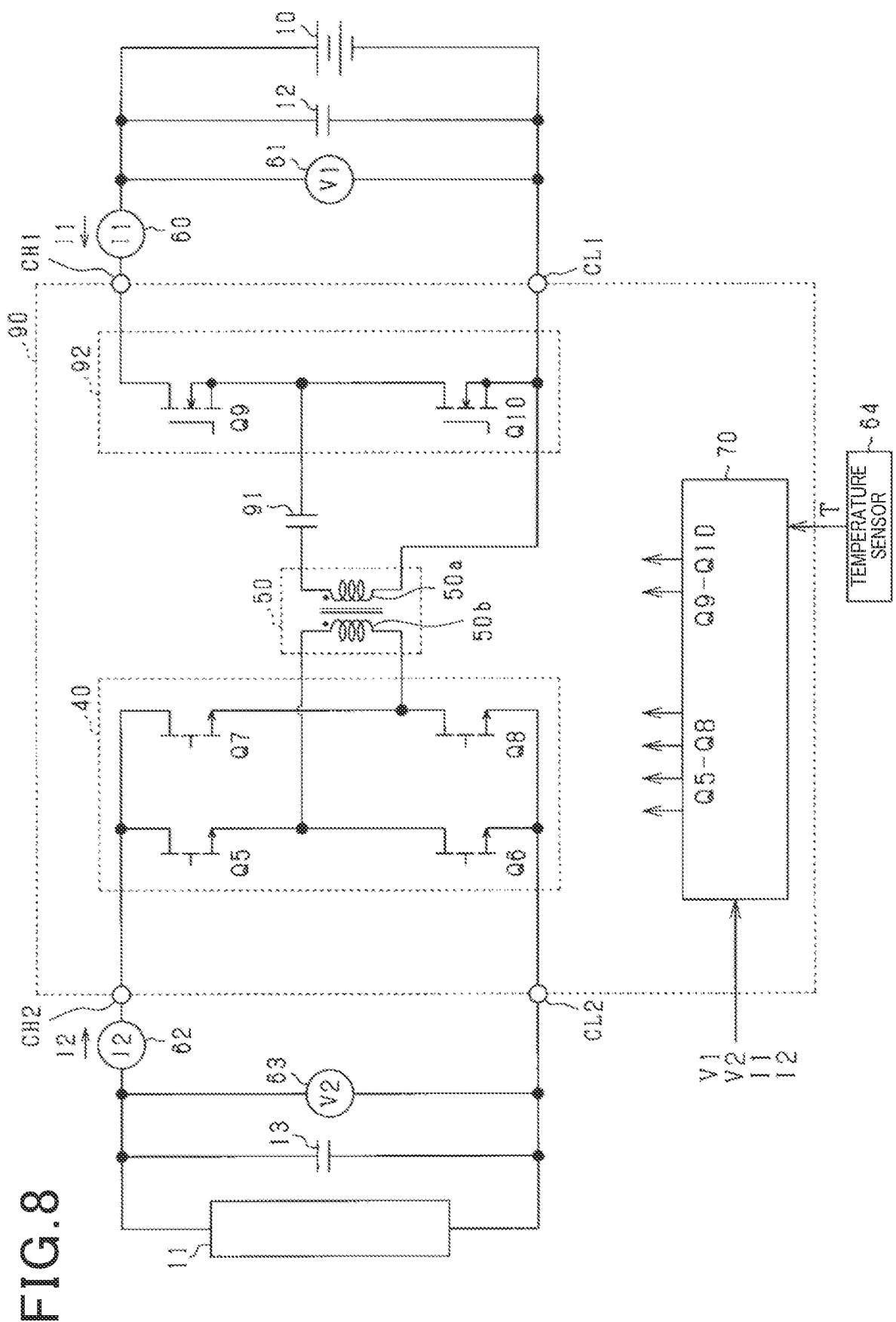
FIG. 8 is a circuit diagram showing a power conversion apparatus according to a second modification of the first embodiment.

FIG. 8 is a configuration according to the present embodiment. In FIG. 8, for the same configurations as shown in foregoing FIG. 1, the same reference symbols are applied for the sake of convenience. The power conversion system is provided with a power conversion apparatus 90.

The power conversion apparatus 90 is provided with a third capacitor 91 and a half bridge circuit 92. According to the present embodiment, the half-bridge circuit 92 corresponds to a conversion circuit.

The half-bridge circuit 92 is provided with a ninth switch Q9 and a tenth switch Q10. According to the present embodiment, the ninth switch Q9 and the tenth switch Q10 are each configured as N-channel MOSFET. The first high voltage side terminal CH1 is connected to the drain of the ninth switch Q9. The drain of the tenth switch Q10 is connected to the source of the ninth switch Q9. The first low voltage terminal CL1 and the second end of the first coil 50a are connected to the source of the tenth switch Q10. The source of the ninth switch Q9 and the drain of the tenth switch Q10 is connected to the first end of the first coil 50a via the third capacitor 91.

According to the present embodiment, the control unit 70 alternately turns the ninth switch Q9 and the tenth switch Q10 which constitute the half-bridge circuit 92. In this case, the duty ratio of the ninth switch Q9 is 0.5. Here, the duty ratio refers to a ratio of the ON period Ton to the first switching period Tsw of the ninth switch Q9 (Ton/Tsw), FIGS. 9A to 9C show a change in the operational states or the like of the fifth to tenth switches Q5 to Q10 in the normal mode and the heating mode. The solid line of FIG. 9A indicates a change in the operational state of the ninth switch Q9 and the dotted line indicates a change in the operational state of the tenth switch Q10. FIG. 9B indicates the operational state of the fifth switch to eighth switch Q8. FIG. 9C indicates a change in the first current I1 and the second current I2.

Hereinafter, with reference to FIGS. 9 and 10, a temperature rise control in a normal mode and a heating mode according to the present embodiment will be described.

As shown in FIG. 9A, in the normal mode and the heating mode according to the present embodiment, fifth to eighth periods T5 to T8 are present during one switching period Tsw. In the fifth period T5 and the eighth period T8, the ninth switch Q9 turns ON and the fifth, sixth, seventh, eighth and tenth switch Q5, Q6, Q7, Q8 and Q10 turn OFF. In the sixth period T6 and the seventh period T7, the tenth switch Q10 turns ON and the fifth, sixth, seventh, eighth and ninth switch Q5, Q6, Q7, Q8 and Q9 turn OFF. Thus, also in the present embodiment, since the fifth switch to eighth switch Q5 to Q8 which constitute the second full-bridge circuit 40 are fixed to be OFF state, a conduction loss due to a reverse conduction current occurs.

FIG. 10A shows a current path in the fifth period T5. In the half bridge circuit 92, a current path is formed including the high voltage side terminal CH1, the ninth switch Q9, the third capacitor 91, the first coil 50a and he first low voltage side terminal CL1. On the other hand, in the second full-bridge circuit 40, a current path which is the same as that of the third period T3 is formed.

Thus, as shown in FIG. 9C, in the fifth period T5, the first current I1 slight increases in the positive direction. On the other hand, the second current I2 slightly increases to the negative side.

FIG. 10B shows a current path in the sixth period T6. In the half bridge circuit 92, a current path is formed including the tenth switch Q10, the third capacitor 91 and the first coil 50a.

In the second full-bridge circuit 40, a current path which is the same as that of the fifth period T5 is formed.

In the sixth period T6, since the first coil 50a is not connected to the first high voltage side terminal CH1, as shown in FIG. 9C, the first current I1 is 0. For the half-bridge circuit 92, an induced voltage is temporarily produced at the first coil 50a such that the voltage at the second end is higher than that of the first end. Thus, at the second coil 50b, an induced voltage is temporarily produced such that the voltage at the first end is higher than that of the second end. Therefore, the absolute value of the second current I2 slightly decreases when the sign of the second current I2 is negative.

FIG. 10C shows a current path in the seventh period T7. In the half bridge circuit 92, a current in the reverse direction flows through the same current path as the sixth period T6. In the second full-bridge circuit 40, a current path is formed including the second low voltage side terminal CL2, the sixth switch Q6, the second coil 50b, the seventh switch Q7 and the second high voltage side terminal CH2.

In the seventh period T7, since the first coil 50a is not connected to the first high voltage side terminal CH1, as shown in FIG. 9C, the first current I1 is 0. A current flows through the half-bridge circuit 92 in a direction opposite to the current flowing in the sixth period T6 in order to discharge electrons stored in the third capacitor 91. Hence, an induced voltage is generated at the second coil 50b such that the voltage at the second end is higher than that of the first end. Accordingly, the second current slightly increases in the negative direction.

FIG. 10D shows a current path in the eighth period T8. In the half bridge circuit 92, a current path is formed including the first low voltage side terminal CL1, the second coil 50b, the third capacitor 91, the ninth switch Q9 and the first high voltage side terminal CH1. In the second full-bridge circuit 40, a current path which is the same as that of the seventh period T7 is formed.

In the eighth period T8, at the second coil 50a, an induced voltage is temporarily produced such that the voltage at the first end is higher than that of the second end. Hence, as shown in FIG. 9C, the sign of the first current becomes negative, and the absolute value of the second current I2 slightly decreases. On the other hand, at the second coil 50b, an induced voltage is temporarily produced such that the voltage at the second end is higher than that of the first end. Hence, the absolute value of the second current I2 slightly decreases when the sign of the second current I2 is negative.

Thus, even in the case where the half-bridge circuit 92 is utilized as the conversion circuit, DC voltage supplied from the storage battery 10 can be converted into AC voltage. Hence, with this AC voltage, a reverse conduction current is made to flow through the fifth to eighth switches Q5 to Q8 that constitute the second full-bridge circuit 40.

Thus, according to the present embodiment described in detail, the same effects and advantages as the first embodiment can be obtained.

Note that, as the tenth switch Q10, it is not limited to the N-channel MOSFET but may be configured as IGBT.

Second Embodiment

Hereinafter, for the second embodiment, with reference to the drawings, configurations different from those in the first embodiment will be mainly described. In the first embodiment, a full-bridge circuit is used for the power conversion apparatus 20, but this configuration is changed in the present embodiment. According to the present embodiment, a configuration of the power conversion apparatus is a boosting chopper circuit.

Figure 11:
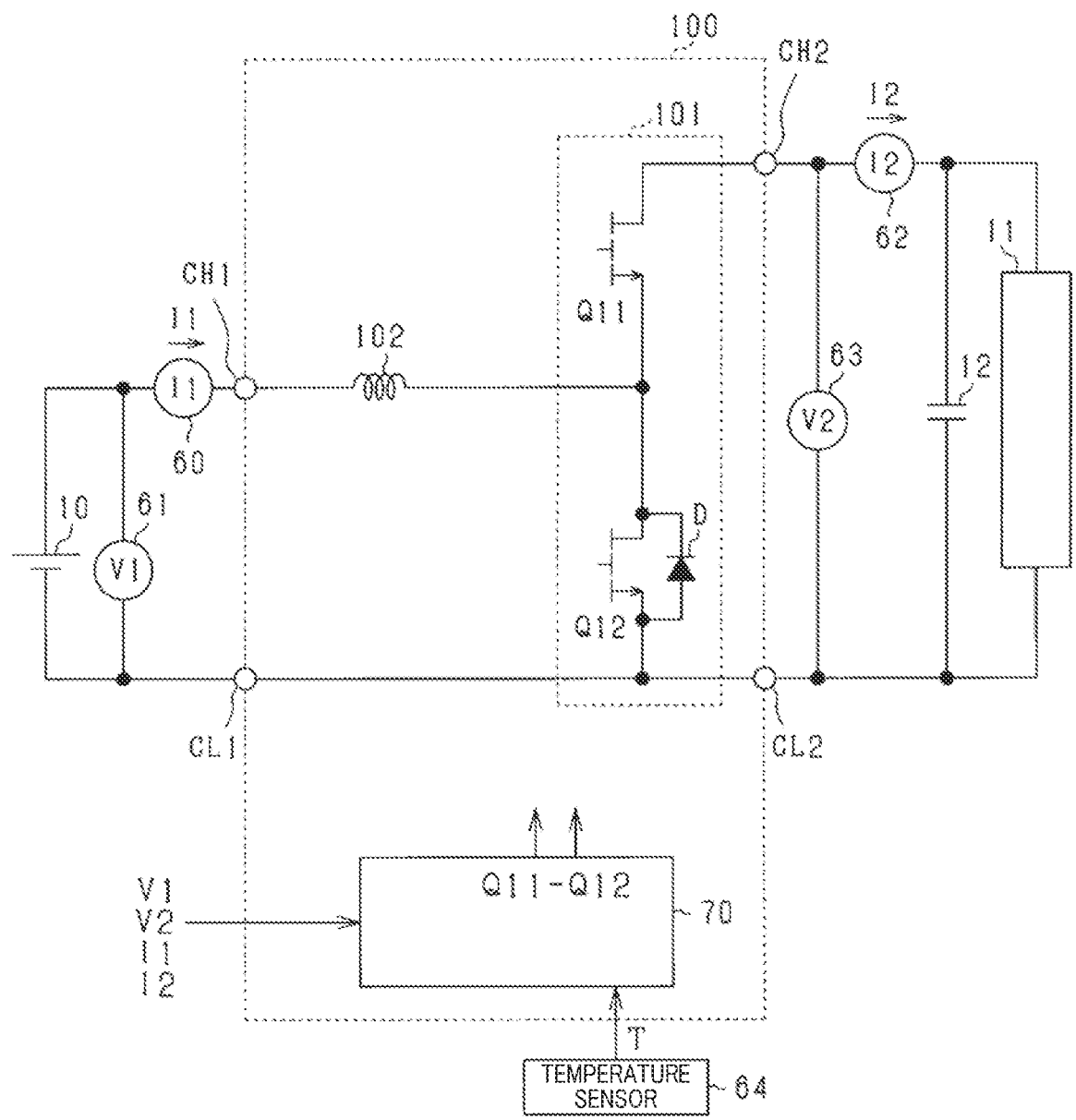
FIG. 11 is a circuit diagram showing a configuration of a power conversion apparatus according to the second embodiment.

FIG. 11 shows a configuration of the present embodiment. In FIG. 11, for the same configurations as shown in foregoing FIG. 1, the same reference symbols are applied for the sake of convenience.

The power conversion system is provided with a storage battery 10, a power supply object 11, a capacitor 12 and a power conversion apparatus 100.

The power conversion apparatus 100 is provided with a first high voltage side terminal CH1, a first low voltage side terminal CL1, a second high voltage side terminal CH2, a second low voltage side terminal CL2, a half-bridge circuit 101 and a reactor 102.

The half-bridge circuit 101 includes an eleventh switch Q11 and the twelfth switch Q12. In the present embodiment, the eleventh switch Q11 is configured as GaN-HEMT and the twelfth switch Q12 is configured as IGBT. The high voltage side terminal CH2 is connected to the drain of the eleventh switch Q11. The collector of the twelfth switch Q12 is connected to the source of the eleventh switch Q11. The first low voltage side terminal CL1 and the second low voltage side terminal CL2 are connected to the emitter of the twelfth switch Q12. The second low voltage side terminal CL2 is connected to the second high voltage side terminal CH2 via the capacitor 12. Moreover, the second low voltage side terminal CL2 is connected to the second high voltage side terminal CH2 via the power supply object 11.

Note that, a diode D as a free-wheel diode is reverse-connected to the twelfth switch Q12. As the twelfth switch Q12, it is not limited to IGBT, but may be configured as N-channel MOSFET. In this case, the diode D is not necessarily provided.

The first end of the reactor 102 is connected to the first high voltage side terminal CH1. The second end of the reactor 102 is connected to the source of the eleventh switch Q11 and he collector of the twelfth switch Q12. The positive terminal of the storage battery 10 is connected to the first high voltage side terminal CH1, and the first low voltage side terminal CL1 is connected to the negative terminal of the storage battery 10.

The power conversion system is provided with a first current sensor 60, a first voltage sensor 61, a second current sensor 62, a second voltage sensor 63 and a temperature sensor 64. The objects to be detected these sensors are the same as those in the first embodiment.

The control unit 70 outputs, based on the respective detection values I1, V1, I2, V2 and T, drive signals to the gates of the eleventh switch Q11 and the twelfth switch Q12 to turns the eleventh switch Q11 and twelfth switch Q12 to be ON and OFF. In the present embodiment, the definition of the sign of the first current I1 is similar to that of the first embodiment, but for the second current I2, the direction of the current flowing from the second high voltage side terminal CH2 to the power supply object is defined as positive, and the opposite direction where the current flows is defined as negative.

Figure 12:
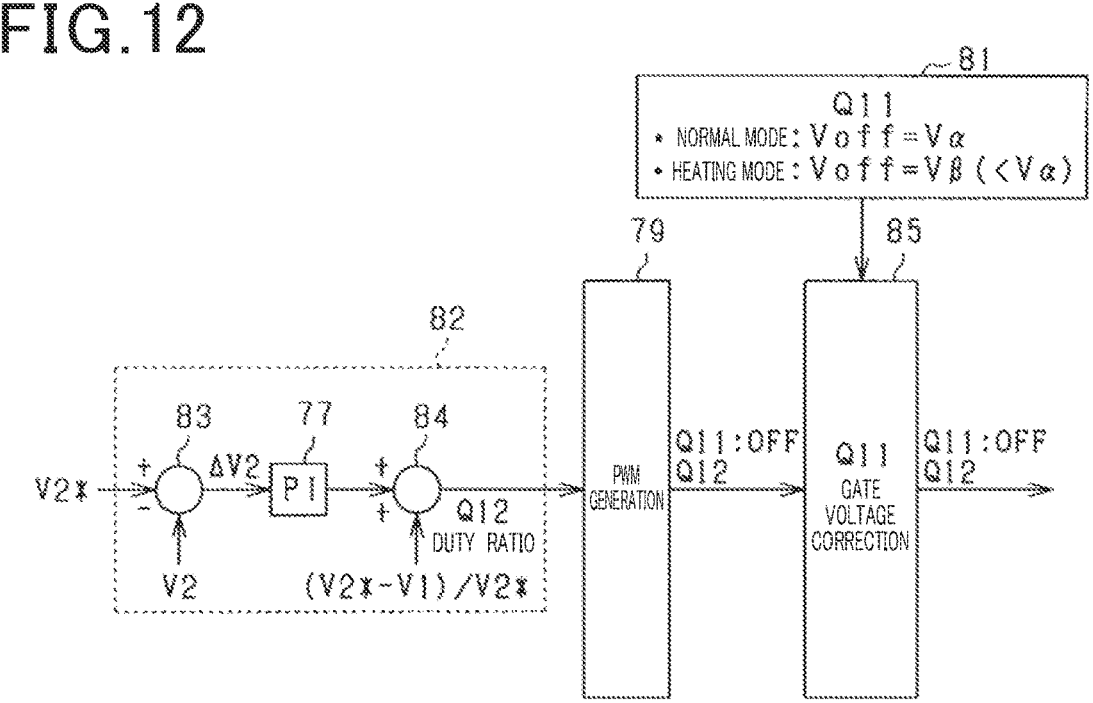
FIG. 12 is a functional block diagram showing a control unit in the normal mode and the heating mode.

FIG. 12 is a diagram showing a control block diagram performed by the control unit 70 in the present embodiment. The control unit 70 is provided with a voltage controller 82. The voltage controller 82 is provided with a voltage deviation calculation unit 83, a feedback control unit 77 and a duty ratio calculation unit 84.

The voltage deviation calculation unit 83 subtracts a second voltage V2 as a detection voltage of the second voltage sensor 63 from a command voltage V2*, thereby calculating the voltage deviation ΔV2.

The feedback control unit 77 calculates the duty ratio of the twelfth switch Q12 as an operation quantity for feedbacking the calculated voltage deviation ΔV2 to be 0.

The duty ratio calculation unit 84 adds a feedforward term (V2*−V1)/V2* to the duty ratio calculated by the feedback control unit 77, thereby obtaining the final duty ratio of the twelfth switch Q12. The duty ratio of the twelfth switch Q12 is outputted to the PWM generation unit 79.

The PWM generation unit 79 generates a drive signal of the eleventh switch Q11 and the twelfth switch Q12 and outputs the generated drive signal to a gate voltage correction unit 85. According to the present embodiment, the eleventh switch Q11 is turned OFF Further, the twelfth switch Q12 is switched to be ON and OFF based on the duty ratio of the twelfth switch Q12.

The gate voltage correction unit 85 corrects, based on a command transmitted from the gate voltage setting unit 81, the gate voltage Voff of the eleventh switch Q11 when turned OFF. Thereafter, the gate voltage correction unit 85 outputs the drive signals to the eleventh switch Q11 and the twelfth switch Q12.

Similar to the first embodiment, the gate voltage setting unit 81 sets the gate voltage Voff of the eleventh switch Q11 when turned OFF.

Figure 13:
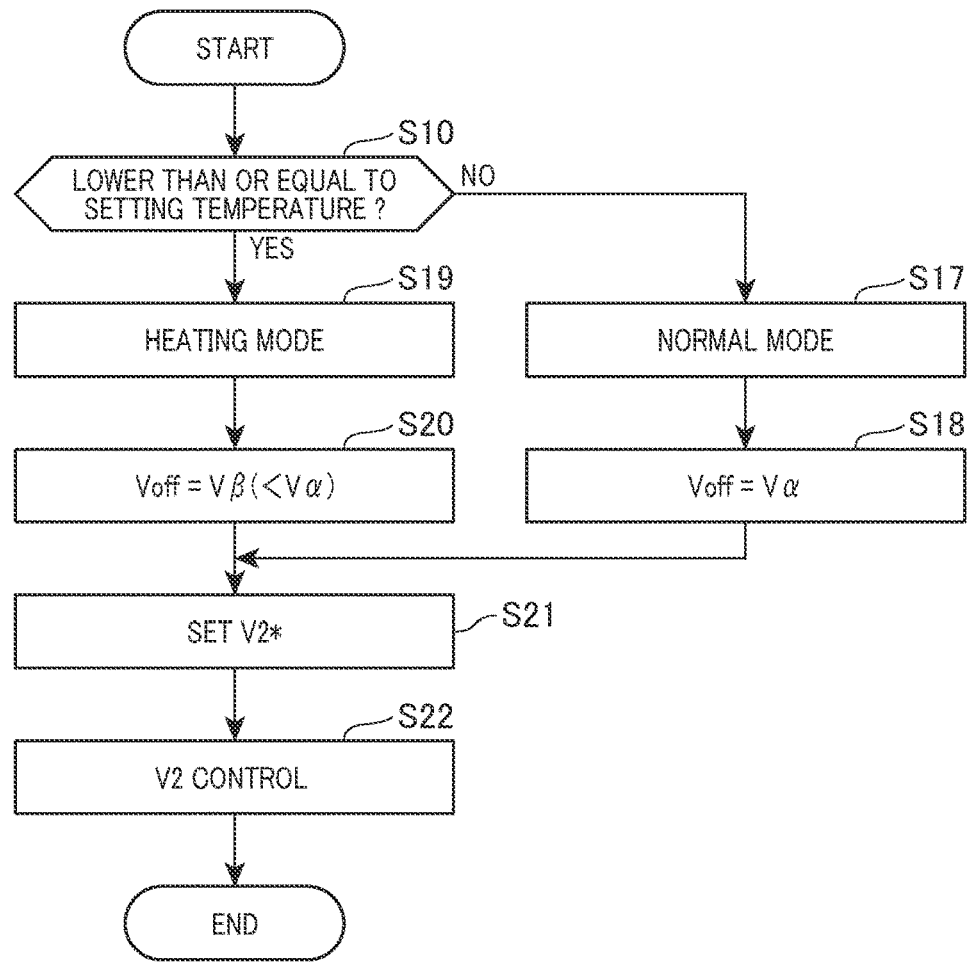
FIG. 13 is a flowchart showing a process of the control unit.

FIG. 13 shows a process executed by the control unit 70. This process is repeatedly executed at a predetermined control period, for example. Note that, in FIG. 13, for the same configurations shown in foregoing FIG. 5, the same reference symbols are applied for the sake of convenience.

When the determination at step S10 is negative, the process determines that no increase request of a heating value is present, proceeds to step S17 and sets the control mode to be the normal mode. In the normal mode, the process sets, at next step S18, the gate voltage Voff of the eleventh switch Q11 when turned OFF to be the first off voltage Vα.

When the determination at step S10 is affirmative, the process determines that an increase request for increasing a heating value is present, proceeds to step S19 and sets the control mode to be the heating mode. In the heating mode, the process sets, at next step S20, the gate voltage Voff of the eleventh switch Q11 when turned OFF to be the second off voltage Vβ. The second off voltage Vβ refers to a value increased to the negative side compared to the first off voltage Vα.

At step S21, the process sets the command voltage V2*.

At step S22, the process turns the eleventh switch Q11 to be OFF and controls the duty ratio of the second switch Q12 such that the second voltage V2 is controlled to be the command voltage V2*.

FIG. 14 shows a change in the operational states or the like of the eleventh switch Q11 and the twelfth switch Q12 in the normal mode and the heating mode. The solid line in FIG. 14A indicates a change in the operational state of the eleventh switch Q11 and the dotted line indicates a change in the operational state of the twelfth switch Q12. FIG. 14B shows a first voltage V1 and a second voltage V2. FIG. 14C shows a change in the first current I1 and the second current I2. FIG. 14D shows a first power P1, a second power P2 and a loss power P1−P2. According to the present embodiment, in the case where the second power P2 is supplied to the power supply object 11 from the power conversion apparatus 100, it is defined as positive. Hence, a value in which the second power P2 is subtracted from the first power P1 is the loss power P1−P2.

As shown in FIG. 14D, the loss power P1−P2 in the heating mode is larger than the loss power P1−P2 in the normal mode. This is because, also in the present embodiment, since the gate voltage Voff when turned OFF in the heating mode increases to the negative side compared to that of the normal mode, the conduction loss due to the reverse conduction current at the eleventh switch Q11 becomes large due to the GaN-HEMT characteristics.

According to the present embodiment described in detail, the same effects and advantages as the first embodiment can be obtained.

Third Embodiment

Hereinafter, for the second embodiment, with reference to the drawings, configurations different from those in the first embodiment will be mainly described. According to the present embodiment, a method for setting the gate voltage Voff when turned OFF by the gate voltage setting unit 81 will be changed.

In the heating mode according to the present embodiment, the gate voltage setting unit 81 controls, based on an environmental temperature Voff, the gate voltages Voff of the fifth to eighth switches Q5 to Q8.

Figure 15:
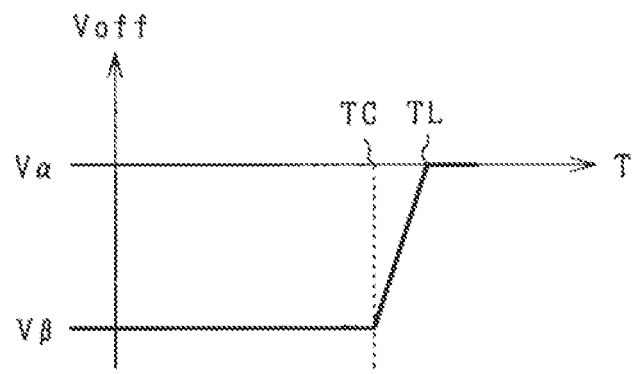
FIG. 15 is graph showing a voltage control method of a gate voltage setting unit in the heating mode.

FIG. 15 shows a voltage control method performed by the gate voltage setting unit 81. The upper limit temperature TL is set, considering a heat tolerance or the like of the temperature increasing object element, to be an allowable upper temperature limit of the temperature increasing object element, for example. In the case where the environmental temperature T is larger than or equal to a limiting start temperature TC which is set to be lower than the upper limit temperature TL, the gate voltage setting unit 81 sets the gate voltages Voff of the fifth to eighth switches Q5 to Q8 when turned OFF to be values based on the environmental temperature. Specifically, the gate voltage setting unit 81 sets, when the environmental temperature T exceeds the limiting start temperature TC, the gate voltages Voff of the fifth to eighth switches Q5 to Q8 when turned OFF to be closer to the first off voltage Vα as the environmental temperature T becomes closer to the upper limit temperature TL. The gate voltage setting unit 81 sets, when the environmental temperature T is the limiting start temperature TC, the gate voltages Voff of the fifth to eighth switches Q5 to Q8 when turned OFF to be the first off voltage Vα. The gate voltages Voff of the fifth to eighth switches Q5 to Q8 when turned OFF thus set are outputted to the gate voltage correction unit 80.

In the case where the environmental temperature T is the upper limit temperature TL or larger, the gate voltage Voff when turned OFF is set to be the first off voltage Vα. Further, in the case where the environmental temperature is the limiting start temperature TC or lower, the gate voltage Voff when turned OFF is set to be the second off voltage Vβ.

Thus, in the case where the environmental temperature T exceeds the limiting start temperature TC, the gate voltages Voff of the fifth to eighth switches Q5 to Q8 when turned OFF are controlled to be gradually lowered, thereby reducing heat produced by the reverse conduction current. As a result, the environmental temperature I can be prevented from exceeding the upper limit temperature TL.

Modification Example of Third Embodiment

Hereinafter, for a modification example of the third embodiment, with reference to the drawings, configurations different from those in the first embodiment will be mainly described. According to the present embodiment, as a method for setting the gate voltage Voff when turned OFF in the heating mode by the gate voltage setting unit 81, a feedback control is utilized.

Figure 16:
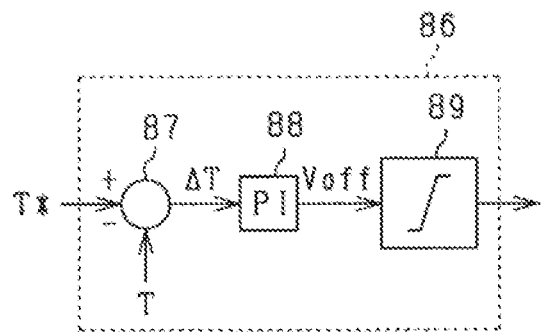
FIG. 16 is a functional block diagram of the gate voltage setting unit in the heating mode.

FIG. 16 is a control block diagram executed by the gate voltage setting unit 81 in the heating mode according to the present embodiment. The gate voltage setting unit 81 is provide with a temperature control unit 86. The temperature control unit 86 includes a temperature deviation calculation unit 87, a feedback control unit 88 and a limiter 89.

The temperature deviation calculation unit 87 subtracts the environmental temperature T from a target temperature T*, thereby calculating the temperature deviation ΔT. Note that, according to the present embodiment, the target temperature T* corresponds to command temperature.

The feedback control unit 88 calculates the gate voltages Voff of the fifth to eighth switches Q5 to Q8 when turned OFF as an operation quantity for feedbacking the calculated temperature deviation ΔT to be 0. For example, when increasing the environmental temperature T, the gate voltage Voff when turned OFF is made to be increased to the negative side. On the other hand, when decreasing the environmental temperature T, the absolute value of the gate voltage Voff when turned OFF is reduced. According to the present embodiment, for this feedback control, a proportional integration control is used. Note that, the feedback control used for the feedback control unit 88 is not limited to the proportional integration control, but a proportional integration differential control may be used.

The gate voltages Voff of the fifth to eighth switches Q5 to Q8 when turned OFF which are calculated by the feedback control unit 88 are restricted by the limiter 89 with the upper limit value or the lower limit value and outputted to the gate voltage correction unit 80. According to the present embodiment, the upper limit value is the first off voltage Vα, and the lower limit value is determined based on the characteristics of the fifth to eighth switches Q5 to Q8.

Thus, the feedback control is performed for the gate voltages Voff of the fifth to eighth switches Q5 to Q8 based on the environmental temperature T, whereby the environmental temperature T can be controlled to be the target temperature T*.

Fourth Embodiment

Hereinafter, for a modification example of the third embodiment, with reference to the drawings, configurations different from those in the first embodiment will be mainly described. According to the present embodiment, the control unit 70 changes the gate voltages Voff of the fifth switch Q5 and the sixth switch Q6 from the second off voltage Vβ to the first off voltage Vα temporarily.

FIGS. 17A to D show a change in the operational states or the like of switches Q1 to Q8 in the case where the gate voltage is when turned OFF is fixed and the gate voltage is when turned OFF is temporarily changed. FIG. 17A shows a change in the operational states of the first switch Q1 and the fourth switch Q4. Inverted operational states of the first switch Q1 and the fourth switch Q4 are the operational states of the second switch Q2 and the third switch Q3. FIG. 17B shows a change in the operational states of the fifth to eighth switches Q5 to Q8. Also in the present embodiment, the fifth to eighth switches Q5 to Q8 are turned OFF. FIG. 17C shows a change in the gate voltages Voff of the fifth switch Q5 and the sixth switch Q6 when turned OFF. FIG. 17D shows a change in the first current I1 and the second current I2.

As shown in FIG. 17C, when the Voff is fixed, the control unit 70 changes the gate voltages Voff of the fifth switch Q5 and the sixth switch Q6 when turned OFF to be the second off voltage Vβ. On the other hand, when Voff is changed, the control unit 70 temporarily changes the gate voltage Voff when turned OFF to be the first off voltage Vα. For example, during the ninth period T9 and the tenth period T10 shown in FIG. 17A, the control unit 70 controls the gate voltage of the sixth switch Q6 when turned OFF to be the first off voltage Vα.

The operational states of the switches Q1 to Q8 in the ninth period T9 is the same as those in the first period T1.

The current path of the ninth period T9 is the same that of the first period T1. In this case, the gate voltage Voff of the sixth switch Q6 when turned OFF is changed to the first off voltage Vα from the second off voltage Vβ, whereby an amount of the voltage drop at the sixth switch Q6 becomes smaller. Thus, since the conduction loss of the sixth switch Q6 becomes smaller, as shown in FIG. 17D, when the Voff is changed, compared to a case where the Voff is fixed, an increase rate of the second current I2 to the negative side becomes higher.

The operational states of the switches Q1 to Q8 in the tenth period T10 is the same as those in the third period T3.

The current path of the tenth period T10 is the same as that of the third period T3. In this case, the gate voltage Voff of the fifth switch Q5 when turned OFF is changed to the first off voltage Vα from the second off voltage Vβ, whereby an amount of the voltage drop at the fifth switch Q5 becomes smaller. Thus, also in this case, since the conduction loss of the fifth switch Q5 becomes smaller, as shown in FIG. 17D, when the Voff is changed, compared to a case where the Voff is fixed, an increase rate of the second current I2 to the negative side becomes higher.

Thus, according to the present embodiment, the control unit 70 sets a period for temporarily changing the gate voltage Voff of a switch where the reverse conduction current is flowing when turned OFF to be the first off voltage Vα. Thus, even in the case where a sufficient voltage difference between the first voltage V1 and the second voltage V2 cannot be secured, since the reverse conduction increases in this period, and thereafter, if the gate voltage Voff is returned to the second off voltage Vβ, the heating value generated in the power conversion apparatus 20 can be larger.

Note that, according to the present embodiment, the gate voltage Voff when turned OFF is temporarily changed is set to be the first off voltage Vα, However, this value is not limited to the first off voltage Vα, but the value may be adjusted to reduce the conduction loss for adjusting the amount of the reverse conduction current.

Also, in the case where a time width for temporarily changing the gate voltage Voff when turned OFF is increased, the reverse conduction current increases, but the heat value due to the reverse conduction current decreases. Hence, when increasing the time width for temporarily changing the gate voltage Voff when turned OFF, the heating value per one switching period turned to be decreased after reaching the maximum value. In this respect, such characteristics is designed in advance or a feedback control with a time width depending on the heating value is performed when it is required, whereby the time width for temporarily changing the gate voltage Voff when turned OFF can be set to be a time width in which the desired heating value is obtained.

Fifth Embodiment

Hereinafter, for a fifth embodiment, with reference to the drawings, configurations different from those in the first embodiment will be mainly described. According to the fifth embodiment, a switching pattern in the heating mode will be changed. According to the first embodiment, the fifth to eighth switches Q5 to Q8 are turned OFF, but in the present embodiment, the fifth to eighth switches Q5 to Q8 are switched between ON and OFF.

FIGS. 18A to 18C show a change in the operational states or the like of the switches Q1 to Q8 in the heating mode according to the present embodiment. The solid line of FIG. 18A shows a change in the operational state of the first switch Q1. The inverted operational state of the first switch Q1 corresponds to the operational state of the second switch Q2. The dotted line of FIG. 18A shows an operational state of the fourth switch Q4. The inverted operational state of the fourth switch Q4 corresponds to the operational state of the third switch Q3. The solid line of FIG. 18B shows a change in the operational state of the eighth switch Q8. The inverted operational state of the eighth switch Q8 corresponds to the operational state of the seventh switch Q7.

The transmission power between the first full-bridge circuit 30 and the second full-bridge circuit 40 is adjusted by controlling the inter-circuit phase φ21. Here, the inter-circuit phase®21 is a phase difference between the switching timing when the fourth switch Q4 is turned ON and the switching timing when the eighth switch Q8 is turned ON.

FIG. 18C shows a change in the gate voltages of the fifth switch Q5 and the eighth switch Q8. The voltage Von1 shows a gate voltage when turned ON in the normal mode, and the voltage Von2 shows a gate voltage when turned ON in the heating mode. The gate voltage Von2 when turned ON in the heating mode is lowered compared to the gate voltage Von1 when turned ON in the normal mode. Also, the Voff1 shows a gate voltage when turned OFF in the normal mode, and the Voff2 shows a gate voltage when turned OFF in the heating mode. The gate voltage Voff when turned OFF in the heating mode is increased to the negative side compared to the gate voltage Voff1 when turned OFF in the normal mode. For example, In the eleventh period T11 shown in FIG. 18A, the gate voltages of the fifth switch Q5 and the eighth switch Q8 when turned ON are set to be Von2. In the twelfth period T12, the gate voltage of the fifth switch Q5 when turned ON is set to be Von2, and the gate voltage of the eighth switch Q8 when turned OFF is set to be Voff2.

The eleventh period T11 refers to a period where the first, fourth, fifth, eighth switches Q1, Q4, Q5 and Q8 are turned ON and the second, third, sixth, seventh switched Q2, Q3, Q6 and Q7 are turned OFF.

Figure 19A:
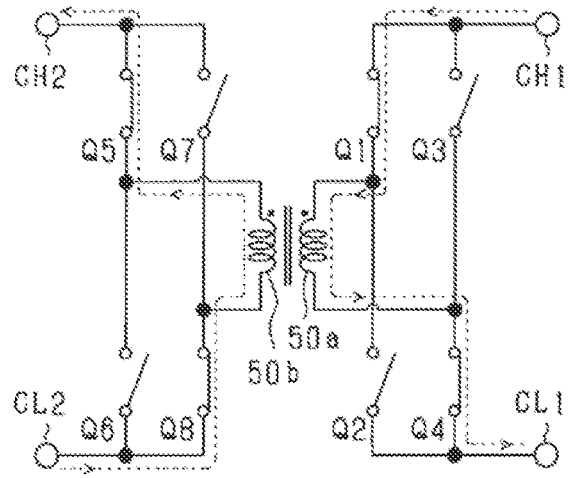
FIGS. 19A and 19B are timing diagrams each showing a current path in the heating mode.

The current path in the eleventh period T11 is, as shown in FIG. 19A, the same as the third period T3. However, unlike the third period T3, the fifth switch Q5 and the eighth switch Q8 are turned ON. Hence, the control unit 70 sets the gate voltages of the fifth switch Q5 and the eighth switch Q8 when turned ON where the reverse conduction current flows are set to be a voltage Von2 which is smaller than the gate voltage Von1 when turned ON in the normal mode, whereby the conduction loss during the reverse conduction can be larger.

The twelfth period T12 refers to a period where the second, third, fifth and seventh switches Q2, Q3, Q5 and Q7 are turned ON and the first, fourth, sixth and eighth switched Q1, Q4, Q6 and Q8 are turned OFF.

Figure 19B:
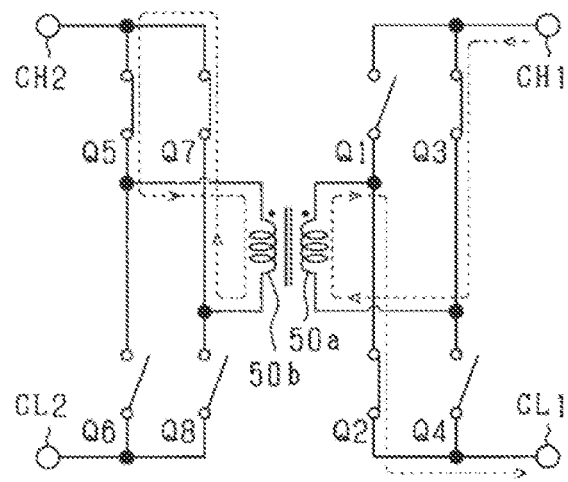

FIG. 19B shows a current path of the twelfth period T12. In the full-bridges circuit 40, a circuit is formed including the second coil 50b, the seventh switch Q7 and the fifth switch Q5. Also in this case, the control unit 70 sets the gate voltage of the fifth switch Q5 when turned ON where the forward conduction current flows to be a voltage Von2 which is smaller than the gate voltage Von1 when turned ON in the normal mode, whereby the conduction loss during the forward conduction can be larger.

Figure 20:
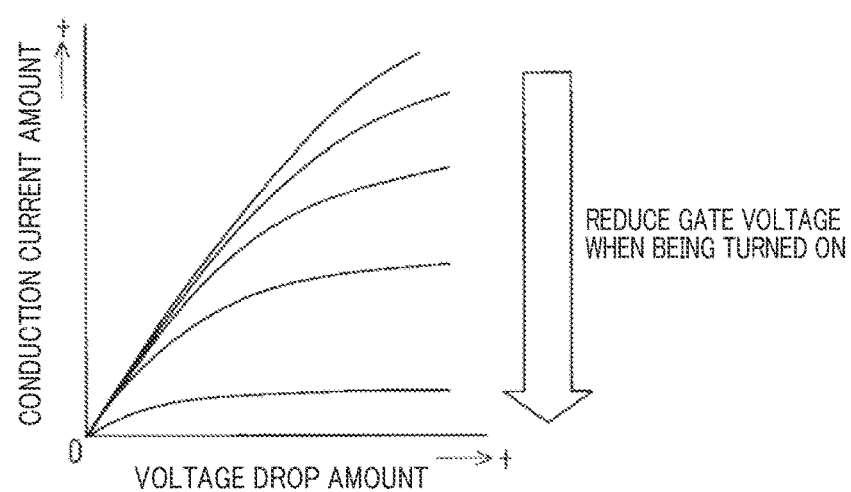

The gate voltage when turned ON is lowered, whereby the conduction loss can be larger during the reverse conduction. This is due to characteristics of the reverse conduction current flowing through the GaN-HEMT shown in FIG. 3. FIG. 20 shows characteristics of an amount of forward conduction current and an amount of voltage drop when the gate voltage of the fifth to eighth switches Q5 and Q8 are lowered. An arrow shown in FIG. 20 indicates a reduction of the gate voltage when turned ON. It is found that the amount of voltage drop with respect to the amount of the forward conduction current increases when lowering the gate voltage when turned ON.

Thus, according to the present embodiment, the gate voltage when turned ON in the heating mode is lowered compared to that in the normal mode, thereby increasing the amount of voltage drop of the fifth to eighth switches Q5 to Q8 and making the conduction loss larger.

Further, the gate voltage when turned ON is lowered, then, the difference between the gate voltage when turned ON and the gate voltage increased to the negative side can be reduced. Hence, also the stress applied to the fifth to eighth switches Q5 to Q8 can be reduced. As a result, the fifth to eighth switches Q5 to Q8 can be prevented from being deteriorated.

Sixth Embodiment

Hereinafter, for the sixth embodiment, with reference to the drawings, configurations different from those in the first embodiment will be mainly described. According to the first embodiment, the fifth to eighth switches Q5 to Q8 are turned OFF in the normal mode which will be changed in the present embodiment. According to the present embodiment, the fifth to eighth switches Q5 to Q8 are switched between ON and OFF.

Figure 21:
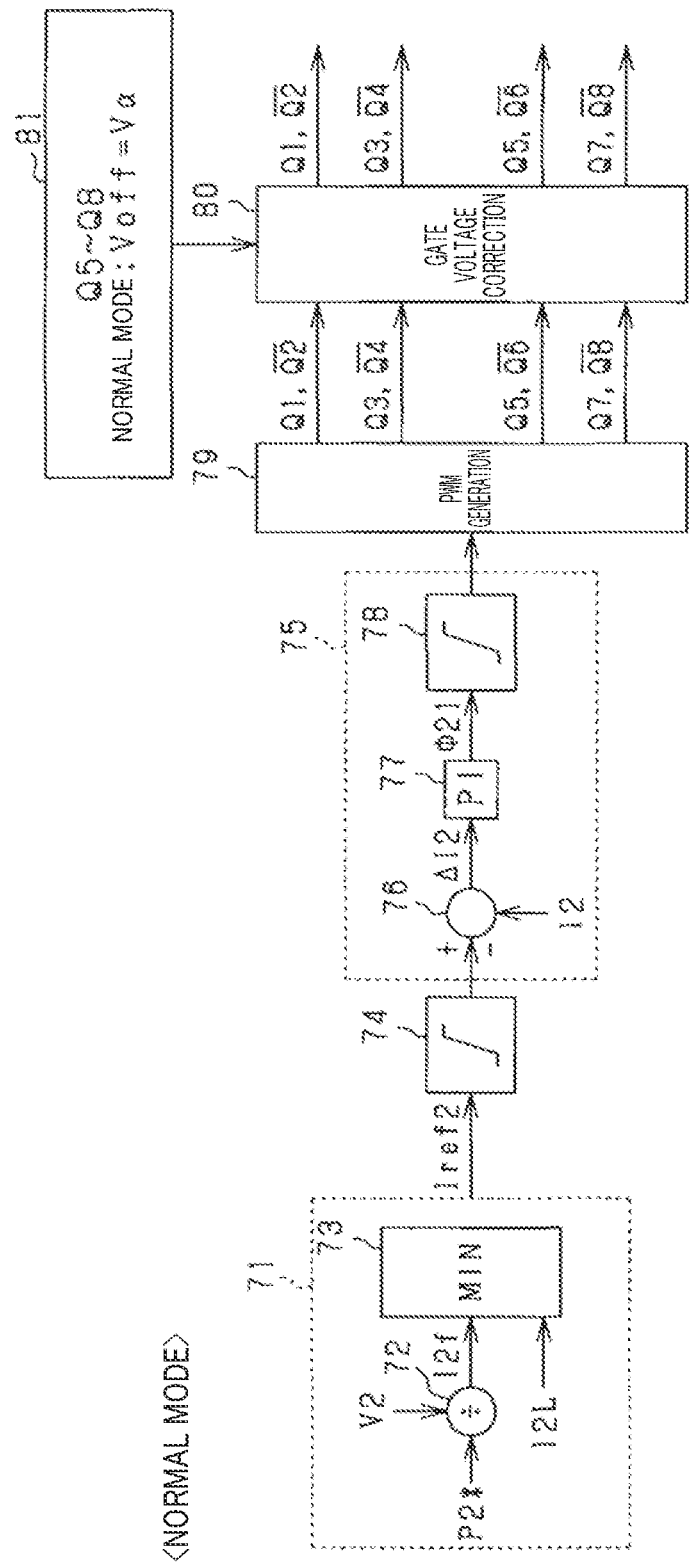
FIG. 21 is a functional block diagram of a control unit in a normal mode according to a sixth embodiment.

FIG. 21 is a diagram showing a control block diagram performed by the control unit 70 in the normal mode. In FIG. 21, for the same configurations as shown in foregoing FIG. 2, the same reference symbols are applied for the sake of convenience. According to the present embodiment, the feedback control unit 77 calculates the inter-circuit phase φ21 as an operation quantity for feedbacking the current deviation ΔI2 to be 0. According to the present embodiment, the inter-circuit phase φ21 is restricted in a range from 0° to a predetermined phase, and within the range, the larger the value, the larger the transmission power to the power supply object 11 from the storage battery 10 is.

The PWM generation unit 79 generates drive signals of switches Q1 to Q8 based on the inter-circuit phase φ21.

The gate voltage correction unit 80 receives a command for changing the gate voltage Voff when turned OFF to be Voff=Vα from the gate voltage setting unit 81, and corrects the gate voltages Voff of the fifth to eight switches Q5 to Q8. Thereafter, the gate voltage correction unit 80 outputs the drive signals to the switches Q1 to Q8.

Figure 22A:
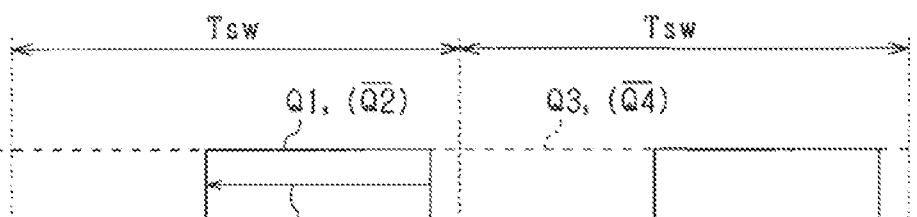
FIGS. 22A and 22B are timing diagrams each showing a change in an operational state of each switch in the normal mode.
Figure 22B:
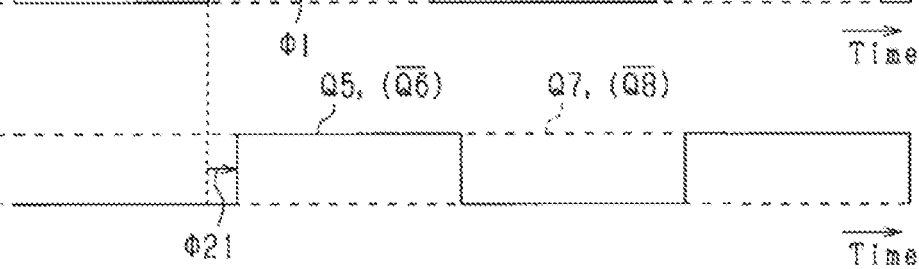

FIGS. 22A and 22B show a change in the operational states of switches Q1 to Q8 in the normal mode. The solid line in FIG. 22A shows a change in the operational state of the first switch Q1. The inverted operational state of the first switch Q1 corresponds to the operational state of the second switch Q2. The dotted line in FIG. 22A shows a change in the operational state of the third switch Q3. The inverted operational state of the third switch Q3 corresponds to the operational state of the fourth switch Q4. The solid line of FIG. 22B shows a change in the operational state of the fifth switch Q5. The inverted operational state of the fifth switch Q5 corresponds to the operational state of the sixth switch Q6. The dotted line of FIG. 22B shows a change in the operational state of the seventh switch Q7. The inverted operational state of the seventh switch Q7 corresponds to the operational state of the eighth switch Q8. The phase difference between the switching timing when the first switch Q1 is turned ON and the switching timing when the fifth switch Q5 is turned ON refers to the inter-circuit phase φ21.

Also in the present embodiment, the same effects and advantages as the first embodiment can be obtained.

Seventh Embodiment

Hereinafter, for the seventh embodiment, with reference to the drawings, configurations different from those in the first embodiment will be mainly described. According to the seventh embodiment, a heat transmission unit is added to the configuration of the first embodiment.

Figure 23:
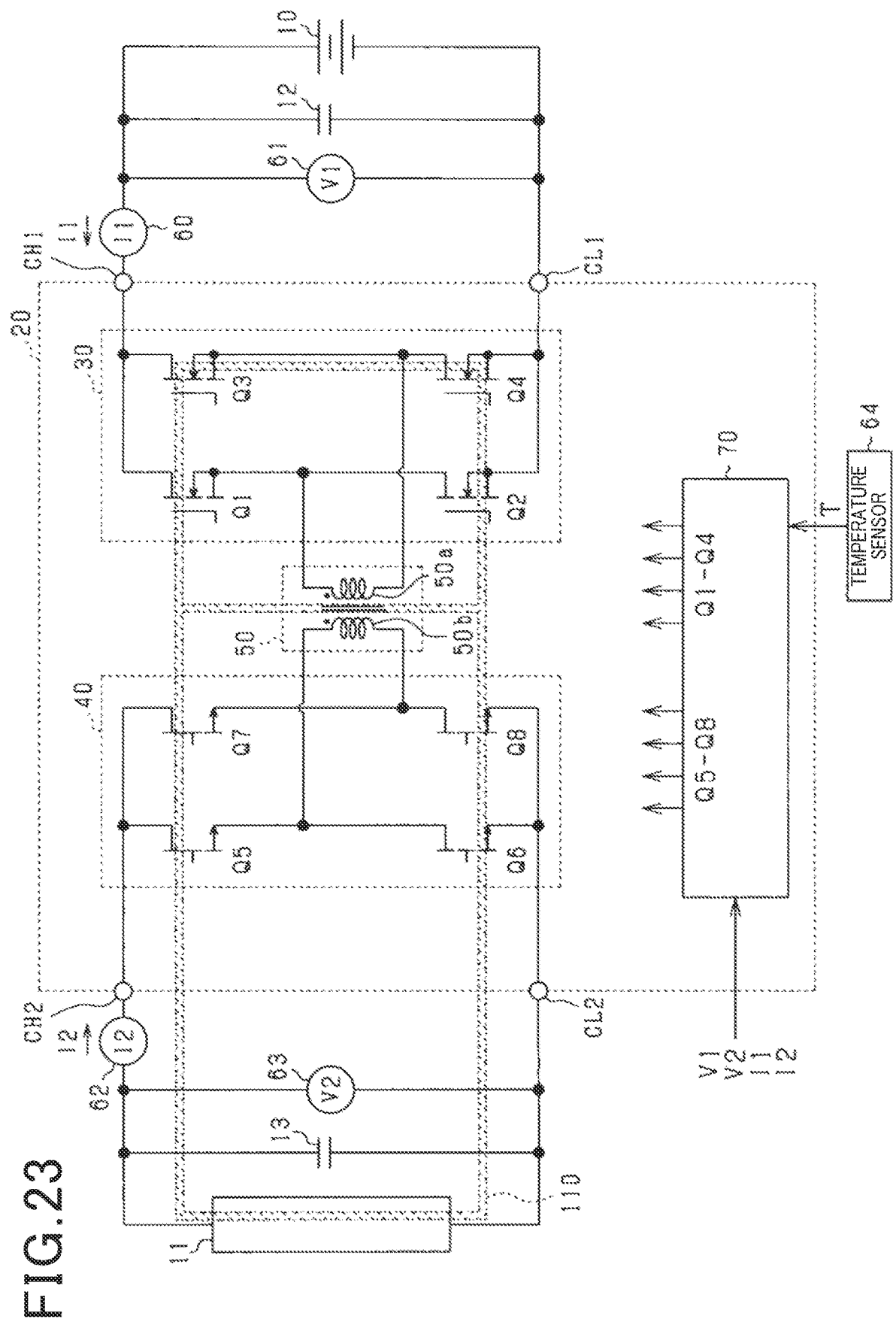
FIG. 23 is a circuit diagram showing a configuration of a power conversion apparatus according to a seventh embodiment.

FIG. 23 shows a configuration of the present embodiment. In FIG. 23, for the same configurations as shown in foregoing FIG. 1, the same reference symbols are applied for the sake of convenience. The power conversion apparatus 20 is provided with a heat transmission unit 110. In the present embodiment, the heat transmission unit 110 is configured to be capable of absorbing a heat produced by a heat exchange object elements including respective switches Q1 to Q8, the transformer 50 and the power supply object 11. The heat transmission unit 110 transmits absorbed heat to the temperature increasing object and increases the temperature increasing object. The temperature increasing object is, for example, the power supply object 11.

As the heat transmission unit 110 may be provided with, for example, a circulation passage in which cooling water circulates between the heat exchange object elements and the temperature increasing object and increase the temperature increasing object element using the cooling water. As the heat transmission unit 110, other than this, for example, one using a gas (air) for the cooling fluid may be utilized. Further, as the heat transmission unit 110, without using the cooling fluid, a component such as a heat sink which comes into contact with the heat exchange object elements and the temperature increasing object element may be utilized.

Thus, since heat produced with the power conversion can be recovered and transmitted to the temperature increasing object element, the temperature of the temperature increasing object element can be effectively increased.

Other Embodiments

Note that, the above-described embodiments may be modified as follows.

According to the third embodiment, a modification example of the third embodiment, the fourth embodiment and the fifth embodiment, the circuit configuration of the power conversion apparatus 20 of the first embodiment is employed. However, the circuit configuration of the power conversion apparatus 90 described in the modification example 2 of the first embodiment can be employed and the same effects and advantages can be obtained therefrom.

The control unit and method thereof disclosed in the present disclosure may be accomplished by a dedicated computer constituted of a processor and a memory programmed to execute one or more functions embodied by computer programs. Alternatively, the control unit and method thereof disclosed in the present disclosure may be accomplished by a dedicated computer provided by a processor configured of one or more dedicated hardware logic circuits. Further, the control unit and method thereof disclosed in the present disclosure may be accomplished by one or more dedicated computer where a processor and a memory programmed to execute one or more functions, and a processor configured of one or more hardware logic circuits are combined. Furthermore, the computer programs may be stored, as instruction codes executed by the computer, into a computer readable non-transitory tangible recording media.

The present disclosure has been described in accordance with the embodiments. However, the present disclosure is not limited to the embodiments and structure thereof. The present disclosure includes various modification examples and modifications within the equivalent configurations. Further, various combinations and modes and other combinations and modes including one element or more or less elements of those various combinations are within the range and technical scope of the present disclosure.

Conclusion

As described, the present disclosure has been achieved in light of the above-described issues, and provides a power conversion apparatus which can be reduced in size thereof.

In order to solve the above-described issues, the present disclosure provides a power conversion apparatus having an input side terminal, an output side terminal and a switch unit, switching the switch unit between ON and OFF during a power transmission where a power is transmitted from a storage unit connected to the input side terminal to a power supply object, wherein the switch unit has characteristics in the case where a reverse conduction current flows through the switch unit, that the larger a gate voltage thereof in a negative side, the larger a conduction loss occurring when the reverse conduction current flows.

The power conversion apparatus includes: a determination unit that determines whether an increase request of a heating value due to the power transmission is present; and a control unit that increases, when determined that the increase request for increasing the heating value is present, the gate voltage of the switch unit to the negative side when turned OFF compared to a case where no increase request for increasing the heating value is present, the reverse conduction current flowing through the switch unit during the power transmission.

According to the present disclosure, the switch unit is turned OFF when performing the power transmission from the storage unit connected to the input side terminal to the power supply object connected to the output terminal. At this moment, a conduction loss occurs when the reverse conduction current flows through the switch unit, and the conduction loss produces heat. The produced heat is utilized, whereby a heating apparatus for increasing the temperature of the temperature increasing object can be made unnecessary, or the heating apparatus can be made smaller even when the heating apparatus is necessary. As a result, according to the present disclosure, the size of the power conversion apparatus can be reduced.

Further, the switch unit according to the present disclosure has characteristics that, in the case where a reverse conduction current flows through the switch unit, the larger a gate voltage thereof in a negative side, the larger a conduction loss occurring when the reverse conduction current flows. Focusing on these characteristics, according to the present disclosure, when determined that the increase request for increasing the heating value due to the power transmission is present, the gate voltage of the switch unit when turned OFF is increased to the negative side compared to a case where no increase request for increasing the heating value is present, the reverse conduction current flowing through the switch unit during the power transmission. Thus, the conduction loss occurring in the switch unit when the above-described increasing request is present can be larger compared to a case where no increasing request is present. As a result, the heating value generated in the power conversion apparatus can be larger.

What is claimed is:

1. A power conversion apparatus having an input side terminal, an output side terminal and a switch unit switching the switch unit between ON and OFF during power transmission where power is transmitted from a storage unit connected to the input side terminal to a power supply object, wherein the switch unit has characteristics that, in the case where a reverse conduction current flows through the switch unit, the larger a gate voltage thereof in a negative side, the larger a conduction loss occurring when the reverse conduction current flows, the power conversion apparatus comprising:
a determination unit that determines whether an increase request of a heating value due to the power transmission is present; and
a control unit that increases, when determined that the increase request for increasing the heating value is present, the gate voltage of the switch unit to the negative side when turned OFF compared to a case where no increase request for increasing the heating value is present, the reverse conduction current flowing through the switch unit during the power transmission.

2. The power conversion apparatus according to claim 1, wherein
the control unit sets, when determined that the increase request is present, the gate voltage of the switch unit when turned OFF based on a temperature of a temperature increasing object element of which the temperature is increased using a heat produced with the power transmission.

3. The power conversion apparatus according to claim 2, wherein
the control unit sets, when the temperature of the temperature increasing object element is higher than or equal to an upper limit temperature, the gate voltage of the switch unit when turned OFF to be a first off voltage; and
the control unit sets, when the temperature of the temperature increasing object element is lower than or equal to a limiting start temperature which is set to be lower than the upper limit temperature, the gate voltage of the switch unit when turned OFF to be a second off voltage which is increased in a negative side than the first off voltage.

4. The power conversion apparatus according to claim 3, wherein
the control unit sets, when the temperature of the temperature increasing object element is higher than the limiting start temperature and lower than the upper limit temperature, the gate voltage of the switch unit when turned OFF to be closer to the first off voltage as the temperature of the temperature increasing object element becomes closer to the upper limit temperature.

5. The power conversion apparatus according to claim 2, wherein
the control unit sets the gate voltage of the switch unit when turned OFF such that the temperature of the temperature increasing object element is feedback-controlled to be a target temperature thereof.

6. The power conversion apparatus according to claim 1, wherein
the power conversion apparatus comprises:
a transformer including a first coil and a second coil which are magnetically coupled with each other;
a conversion circuit connected to the input side terminal and the first coil, converting a DC voltage supplied from the storage unit to be an AC voltage and applying the converted AC voltage to the first coil; and
a full-bridge circuit connected to the output terminal and the second coil, having the switch unit,
wherein
the control unit sets, when determined that the increase request is present, a period where the gate voltage of the switch unit when turned OFF is temporarily increased to a positive side, the reverse conduction current flowing through the switch unit.

7. The power conversion apparatus according to claim 1, wherein
the power conversion apparatus comprises:
a transformer including a first coil and a second coil which are magnetically coupled with each other;
a conversion circuit connected to the input side terminal and the first coil, converting a DC voltage supplied from the storage unit to be a AC voltage and applying the converted AC voltage to the first coil; and
a full-bridge circuit connected to the output terminal and the second coil, having the switch unit,
wherein
the control unit sets, when determined that the increase request is present, the gate voltage of the switch unit when turned ON to be lowered compared to a case where no increase request is present.

8. The power conversion apparatus according to claim 1, wherein
the control unit turns the switch unit through which the reverse conduction current flows during the power transmission, to be ON when determined that no increase request is present.

9. The power conversion apparatus according to claim 1, wherein
the power conversion apparatus comprises a heat transmission unit that absorbs heat generated with the power transmission and transmits the generated heat to the temperature increasing object element.

* * * * *